United States Patent
Nyalamadugu et al.

(10) Patent No.: US 11,403,506 B2
(45) Date of Patent: Aug. 2, 2022

(54) DETACHABLE RADIO FREQUENCY IDENTIFICATION SWITCH TAG

(71) Applicant: NEOLOGY, INC., San Diego, CA (US)

(72) Inventors: Sheshi Nyalamadugu, San Diego, CA (US); Joe Mullis, Oceanside, CA (US)

(73) Assignee: NEOLOGY, INC., San Diego, CA (US)

( * ) Notice: Subject to any disclaimer, the term of this patent is extended or adjusted under 35 U.S.C. 154(b) by 293 days.

(21) Appl. No.: 16/677,653

(22) Filed: Nov. 7, 2019

(65) Prior Publication Data

US 2020/0074261 A1  Mar. 5, 2020

Related U.S. Application Data

(63) Continuation-in-part of application No. 16/365,465, filed on Mar. 26, 2019, now Pat. No. 10,679,115,
(Continued)

(51) Int. Cl.
*G08B 21/00* (2006.01)
*G06K 19/077* (2006.01)
(Continued)

(52) U.S. Cl.
CPC ... *G06K 19/07767* (2013.01); *G06K 19/0724* (2013.01); *G06K 19/0776* (2013.01);
(Continued)

(58) Field of Classification Search
CPC ......... G06K 19/07767; G06K 19/0724; G06K 19/0776; G06K 19/07786; G06K 19/07794; H04B 5/0062; H04B 5/0081
(Continued)

(56) References Cited

U.S. PATENT DOCUMENTS

| 4,268,834 A | 5/1981 | Henry |
| 5,337,063 A | 8/1994 | Takahira |

(Continued)

FOREIGN PATENT DOCUMENTS

| CN | 102332634 A | 1/2012 |
| DE | 19742126 A1 | 3/1999 |

(Continued)

OTHER PUBLICATIONS

Malmstadt et al., Electronics for Scientists: Principles and Experiments for Those Who Use Instruments, Inter Partes Review of U.S. Pat. No. 8,944,337, IPR Case No. IPR2016-01763, Exhibit No. 2019, exhibit filing date Jun. 21, 2017, pp. 1-3.

(Continued)

*Primary Examiner* — Mark S Rushing
(74) *Attorney, Agent, or Firm* — Procopio, Cory, Hargreaves & Savitch LLP

(57) ABSTRACT

A radio frequency identification (RFID) switch tag is disclosed. This RFID switch tag includes a base component having an ultra-high frequency (UHF) booster, and a detachable component having at least one UHF RFID module and a high frequency (HF) RFID module. In some embodiments, the detachable component is positioned in close proximity to the base component in a first configuration of the RFID switch tag such that the at least one UHF RFID module is sufficiently coupled to the UHF booster in the base component to form an UHF RFID system having a desired performance. The detachable component can also be separated from the base component to obtain a second configuration of the RFID switch tag, and the HF RFID module remains functional within the detached detachable component so that the detachable component can be used as a standalone HF RFID tag.

20 Claims, 11 Drawing Sheets

Related U.S. Application Data which is a continuation of application No. 15/160,982, filed on May 20, 2016, now Pat. No. 10,339,436.

(60) Provisional application No. 62/757,018, filed on Nov. 7, 2018, provisional application No. 62/165,167, filed on May 21, 2015.

(51) Int. Cl.
*G06K 19/07* (2006.01)
*H04B 5/00* (2006.01)

(52) U.S. Cl.
CPC . *G06K 19/07786* (2013.01); *G06K 19/07794* (2013.01); *H04B 5/0062* (2013.01); *H04B 5/0081* (2013.01)

(58) Field of Classification Search
USPC ...................................................... 340/10.42
See application file for complete search history.

(56) References Cited

U.S. PATENT DOCUMENTS

| | | | |
|---|---|---|---|
| 6,342,839 B1 | 1/2002 | Curkendall et al. | |
| 6,378,774 B1 | 4/2002 | Emori et al. | |
| 6,466,131 B1 | 10/2002 | Tuttle et al. | |
| 6,522,308 B1 | 2/2003 | Mathieu | |
| 7,091,860 B2 | 8/2006 | Martinez de Velasco Cortina et al. | |
| 7,782,206 B2 | 8/2010 | Burnett et al. | |
| 7,859,393 B2 | 12/2010 | Suzuki et al. | |
| 8,350,673 B2 | 1/2013 | Nyalamadugu et al. | |
| 8,710,960 B2 | 4/2014 | Nyalamadugu et al. | |
| 9,098,790 B2 | 8/2015 | Nyalamadugu et al. | |
| 2001/0048361 A1* | 12/2001 | Mays ................. | G06K 7/10297 340/10.51 |
| 2003/0016136 A1 | 1/2003 | Harvey | |
| 2003/0116634 A1 | 6/2003 | Tanaka | |
| 2003/0132301 A1 | 7/2003 | Selker | |
| 2004/0188531 A1 | 9/2004 | Gengel et al. | |
| 2005/0012616 A1 | 1/2005 | Forster et al. | |
| 2005/0038736 A1 | 2/2005 | Saunders | |
| 2005/0186904 A1 | 8/2005 | Kowalski et al. | |
| 2005/0237198 A1 | 10/2005 | Waldner et al. | |
| 2005/0242950 A1 | 11/2005 | Lindsay et al. | |
| 2005/0242957 A1 | 11/2005 | Lindsay et al. | |
| 2006/0054710 A1 | 3/2006 | Forster et al. | |
| 2006/0132313 A1 | 6/2006 | Moskowitz | |
| 2006/0145851 A1 | 7/2006 | Posamentier | |
| 2007/0008140 A1 | 1/2007 | Saarisalo et al. | |
| 2007/0069858 A1* | 3/2007 | Kubo ............... | G06K 19/07749 340/10.1 |
| 2007/0075837 A1 | 4/2007 | Tuttle et al. | |
| 2007/0109101 A1 | 5/2007 | Colby | |
| 2007/0144662 A1 | 6/2007 | Armijo et al. | |
| 2007/0200681 A1 | 8/2007 | Colby | |
| 2007/0200682 A1 | 8/2007 | Colby | |
| 2007/0210923 A1 | 9/2007 | Butler et al. | |
| 2007/0279231 A1 | 12/2007 | Cheng et al. | |
| 2007/0285246 A1 | 12/2007 | Koyama | |
| 2007/0290856 A1 | 12/2007 | Martin | |
| 2008/0084310 A1 | 4/2008 | Nikitin et al. | |
| 2008/0147461 A1 | 6/2008 | Lee et al. | |
| 2008/0211675 A1 | 9/2008 | Forster et al. | |
| 2008/0238679 A1 | 10/2008 | Rofougaran et al. | |
| 2008/0265039 A1 | 10/2008 | Skowronek et al. | |
| 2008/0308641 A1 | 12/2008 | Finn | |
| 2009/0096611 A1 | 4/2009 | Jones | |
| 2009/0219158 A1 | 9/2009 | Nikitin et al. | |
| 2009/0231139 A1 | 9/2009 | Heurtier | |
| 2010/0079289 A1 | 4/2010 | Brandt et al. | |
| 2010/0097280 A1 | 4/2010 | Zirbes et al. | |
| 2010/0123010 A1 | 5/2010 | Sakama | |
| 2010/0230498 A1 | 9/2010 | Atherton | |
| 2010/0283690 A1 | 11/2010 | Artigue et al. | |
| 2010/0302012 A1 | 12/2010 | Roesner | |
| 2011/0006959 A1 | 1/2011 | Menko et al. | |
| 2011/0084888 A1 | 4/2011 | Nishioka et al. | |
| 2011/0309931 A1 | 12/2011 | Rose | |
| 2012/0161937 A1 | 6/2012 | Chen | |
| 2012/0248929 A1 | 10/2012 | Fish et al. | |
| 2012/0280045 A1* | 11/2012 | Mullis ................. | G06K 19/041 235/492 |
| 2013/0105584 A1 | 5/2013 | Forster | |
| 2014/0351027 A1 | 11/2014 | Gravelle et al. | |
| 2015/0077297 A1 | 3/2015 | Forster | |

FOREIGN PATENT DOCUMENTS

| | | |
|---|---|---|
| EP | 1087332 A1 | 3/2001 |
| EP | 2056234 A2 | 5/2009 |
| FR | 2757952 A1 | 7/1998 |
| WO | 2012025787 A1 | 3/2012 |

OTHER PUBLICATIONS

Mazda, F .F ., Discrete Electronics Components, 1981, Inter Partes Review of U.S. Pat. No. 8,944,337, IPR Case No. IPR2016-01763, Exhibit No. 2031, exhibit filing date Jun. 21, 2017, pp. 1-11.

Motion to Amend Claims, Inter Partes Review of U.S. Pat. No. 8,944,337, IPR Case No. IPR2016-01763, Paper No. 13, filing date Jun. 21, 2017, pp. 1-35.

PCT International Publication No. 2003/079487 A1, to Roshchupkin, Inter Partes Review of U.S. Pat. No. 8,944,337, IPR Case No. IPR2016-01763, Exhibit No. 2003, exhibit filing date Dec. 22, 2016, pp. 1-38.

PCT International Publication No. 2008/074050 A1, to Peter Samuel Atherton, Inter Partes Review of U.S. Pat. No. 8,944,337, IPR Case No. IPR2016-01763, Exhibit No. 1006, exhibit filing date Sep. 9, 2016, pp. 1-21.

PCT International Publication No. 2008/074050 A1, to Peter Samuel Atherton, Inter Partes Review of U.S. Pat. No. 8,944,337, IPR Case No. IPR2016-01763, Exhibit No. 2014, exhibit filing date Jun. 21, 2017, pp. 1-21.

Petition, Inter Partes Review of U.S. Pat. No. 8,944,337, IPR Case No. IPR2016-01763, Paper No. 1, filing date Sep. 9, 2016, pp. 1-87.

Petitioner's Amended Appendix of Exhibits, Inter Partes Review of U.S. Pat. No. 8,944,337, IPR Case No. IPR2016-01763, Paper No. 18, filing date Sep. 21, 2017, p. 1-5.

Petitioner's Motion to Exclude, Inter Partes Review of U.S. Pat. No. 8,944,337, IPR Case No. IPR2016-01763, Paper No. 38, filing date Dec. 6, 2017, pp. 1-14.

Petitioner's Opposition to Patent Owner's Contingent Motion to Amend, Inter Partes Review of U.S. Pat. No. 8,944,337, IPR Case No. IPR2016-01763, Paper No. 17, filing date Sep. 21, 2017, pp. 1-32.

Petitioner's Reply to Patent Owner's Response, Inter Partes Review of U.S. Pat. No. 8,944,337, IPR Case No. IPR2016-01763, Paper No. 16, filing date Sep. 21, 2017, pp. 1-39.

Petitioner's Sur-Reply To Patent Owner's Reply To Petitioner's Opposition To Patent Owner's Contingent Motion To Amend, Inter Partes Review of U.S. Pat. No. 8,944,337, IPR Case No. IPR2016-01763, Paper No. 31, filing date Nov. 17, 2017, pp. 1-18.

Poynting, Universal Modem-to-Antenna Adaptor, Inter Partes Review of U.S. Pat. No. 8,944,337, IPR Case No. IPR2016-01763, Exhibit No. 2004, exhibit filing date Dec. 22, 2016, pp. 1-2.

Pozar, David M., Excerpts from Microwave Engineering 4th Ed., Inter Partes Review of U.S. Pat. No. 8,944,337, IPR Case No. IPR2016-01763, Exhibit No. 2052, exhibit filing date Oct. 19, 2017, pp. 1-3.

Preliminary Response, Inter Partes Review of U.S. Pat. No. 8,944,337, IPR Case No. IPR2016-01763, Paper No. 7, filing date Dec. 22, 2016, pp. 1-62.

Reference Designer Chapter 4.1 Impedance of Capacitor 2009, Inter Partes Review of U.S. Pat. No. 8,944,337, IPR Case No. IPR2016-01763, Exhibit No. 2009, exhibit filing date Dec. 22, 2016, pp. 1-2.

(56) References Cited

OTHER PUBLICATIONS

Reference Designer Chapter 4.1 Parallel Plate Capacitor 2009, Inter Partes Review of U.S. Pat. No. 8,944,337, IPR Case No. IPR2016-01763, Exhibit No. 2010, exhibit filing date Dec. 22, 2016, p. 1.
Reply to Petitioner's Opposition to Contingent Motion to Amend, Inter Partes Review of U.S. Pat. No. 8,944,337, IPR Case No. IPR2016-01763, Paper No. 20, filing date Oct. 19, 2017, pp. 1-19.
Response to IPR, Inter Partes Review of U.S. Pat. No. 8,944,337, IPR Case No. IPR2016-01763, Paper No. 12, filing date Jun. 21, 2017, pp. 1-63.
Stein, Jess (Editor), Excerpt from The Random House Dictionary of the English Language, 1966, Inter Partes Review of U.S. Pat. No. 8,944,337, IPR Case No. IPR2016-01763, Exhibit No. 1050, exhibit filing date Nov. 17, 2017, pp. 1-5.
Supplemental Fischer Declaration ISO PO's Motion to Amend, Inter Partes Review of U.S. Pat. No. 8,944,337, IPR Case No. IPR2016-01763, Exhibit No. 2044, exhibit filing date Oct. 19, 2017, pp. 1-36.
U.S. Patent Application Publication No. 2004/0242285 A1, to Farshi, Pub. Date Dec. 2, 2004, Inter Partes Review of U.S. Pat. No. 8,944,337, IPR Case No. IPR2016-01763, Exhibit No. 2006, exhibit filing date Dec. 22, 2016, pp. 1-9.
U.S. Patent Application Publication No. 2005/0134461 A1, to Gelbman et al.. Inter Partes Review of U.S. Pat. No. 8,944,337, IPR Case No. IPR2016-01763, Exhibit No. 2022, exhibit filing date Jun. 21, 2017, pp. 1-27.
U.S. Patent Application Publication No. 2007/0144662, to Armijo et al., Inter Partes Review of U.S. Pat. No. 8,944,337, IPR Case No. IPR2016-01763, Exhibit No. 1016, exhibit filing date Sep. 9, 2016, pp. 1-13.
U.S. Patent Application Publication No. 2007/0290858, to Janke et al., Inter Partes Review of U.S. Pat. No. 8,944,337, IPR Case No. IPR2016-01763, Exhibit No. 1008, exhibit filing date Sep. 9, 2016, pp. 1-5.
U.S. Patent Application Publication No. 2010/0283690, to Artigue et al., Inter Partes Review of U.S. Pat. No. 8,944,337, IPR Case No. IPR2016-01763, Exhibit No. 1020, exhibit filing date Sep. 9, 2016, pp. 1-12.
U.S. Patent Application Publication No. 2010/0302012, to Bruce B. Roesner, Inter Partes Review of U.S. Pat. No. 8,944,337, IPR Case No. IPR2016-01763, Exhibit No. 1009, exhibit filing date Sep. 9, 2016, pp. 1-14.
U.S. Patent Application Publication No. 2012/0280045 A1, to Mullis et al., Inter Partes Review of U.S. Pat. No. 8,944,337, IPR Case No. IPR2016-01763, Exhibit No. 2025, exhibit filing date Jun. 21, 2017, pp. 1-17.
U.S. Patent Application Publication No. 2014/0175177 A1, to Mullis et al., Inter Partes Review of U.S. Pat. No. 8,944,337, IPR Case No. IPR2016-01763, Exhibit No. 2026, exhibit filing date Jun. 21, 2017, pp. 1-16.
U.S. Pat. No. 5,659,324 to Taniguchi et al., issued Aug. 19, 1997, Inter Partes Review of U.S. Pat. No. 8,944,337, IPR Case No. IPR2016-01763, Exhibit No. 2007, exhibit filing date Dec. 22, 2016, pp. 1-79.
U.S. Pat. No. 6,121,544, to Petsinger (issued Sep. 19, 2000), Inter Partes Review of U.S. Pat. No. 8,944,337, IPR Case No. IPR2016-01763, Exhibit No. 1051, exhibit filing date Nov. 17, 2017, pp. 1-16.
U.S. Pat. No. 674,284, to C.A. Sachs, issued May 14, 1901, Inter Partes Review of U.S. Pat. No. 8,944,337, IPR Case No. IPR2016-01763, Exhibit No. 1015, exhibit filing date Sep. 9, 2016, pp. 1-6.
U.S. Pat. No. 7,120,987, to Peikang Liu et al., issued Oct. 17, 2006, Inter Partes Review of U.S. Pat. No. 8,944,337, IPR Case No. IPR2016-01763, Exhibit No. 1018, exhibit filing date Sep. 9, 2016, pp. 1-15.
U.S. Pat. No. 7,361,251, to Green et al., issued Apr. 22, 2008, Inter Partes Review of U.S. Pat. No. 8,944,337, IPR Case No. IPR2016-01763, Exhibit No. 1017, exhibit filing date Sep. 9, 2016, pp. 1-28.
U.S. Pat. No. 7,437,148 B1, to Vaghi et al., issued Oct. 14, 2008, Inter Partes Review of U.S. Pat. No. 8,944,337, IPR Case No. IPR2016-01763, Exhibit No. 2005, exhibit filing date Dec. 22, 2016, pp. 1-28.
U.S. Pat. No. 7,460,018, to Yuki Kubo, issued Dec. 2, 2008, Inter Partes Review of U.S. Pat. No. 8,944,337, IPR Case No. IPR2016-01763, Exhibit No. 1007, exhibit filing date Sep. 9, 2016, pp. 1-13.
U.S. Pat. No. 7,571,694, to Rick Boerner, issued Aug. 11, 2009, Inter Partes Review of U.S. Pat. No. 8,944,337, IPR Case No. IPR2016-01763, Exhibit No. 1013, exhibit filing date Sep. 9, 2016, pp. 1-22.
U.S. Pat. No. 7,782,206 B2, to Burnett et al., Inter Partes Review of U.S. Pat. No. 8,944,337, IPR Case No. IPR2016-01763, Exhibit No. 2021, exhibit filing date Jun. 21, 2017, pp. 1-10.
U.S. Pat. No. 8,350,673, to Nyalamadugu et al., issued Jan. 8, 2013, Inter Partes Review of U.S. Pat. No. 8,944,337, IPR Case No. IPR2016-01763, Exhibit No. 1012, exhibit filing date Sep. 9, 2016, pp. 1-9.
U.S. Pat. No. 8,416,079 B2, to Roesner, issued on Apr. 9, 2013, Inter Partes Review of U.S. Pat. No. 8,944,337, IPR Case No. IPR2016-01763, Exhibit No. 2012, exhibit filing date Dec. 22, 2016, pp. 1-18.
U.S. Pat. No. 8,604,995, to Hammad (issued Dec. 10, 2013), Inter Partes Review of U.S. Pat. No. 8,944,337, IPR Case No. IPR2016-01763, Exhibit No. 1052, exhibit filing date Nov. 17, 2017, pp. 1-15.
U.S. Pat. No. 8,944,337, to Mullis et al., Inter Partes Review of U.S. Pat. No. 8,944,337, IPR Case No. IPR2016-01763, Exhibit No. 1004, exhibit filing date Sep. 9, 2016, pp. 1-17.
U.S. Pat. No. 9,582,746, to Mullins et al., Inter Partes Review of U.S. Pat. No. 8,944,337, IPR Case No. IPR2016-01763, Exhibit No. 1032, exhibit filing date Sep. 21, 2017, pp. 1-17.
372 Application, to Mullis et al., Inter Partes Review of U.S. Pat. No. 8,944,337, IPR Case No. IPR2016-01763, Exhibit No. 2024, exhibit filing date Jun. 21, 2017, pp. 1-20.
586 Application, to Mullis et al., Inter Partes Review of U.S. Pat. No. 8,944,337, IPR Case No. IPR2016-01763, Exhibit No. 2023, exhibit filing date Jun. 21, 2017, pp. 1-17.
Balanis, Constantine A., Excerpts from Antenna Theory, Inter Partes Review of U.S. Pat. No. 8,944,337, IPR Case No. IPR2016-01763, Exhibit No. 2056, exhibit filing date Dec. 6, 2017, pp. 1-4.
Boylestad, Introductory Circuit Analysis, Inter Partes Review of U.S. Pat. No. 8,944,337, IPR Case No. IPR2016-01763, Exhibit No. 2016, exhibit filing date Jun. 21, 2017, pp. 1-3.
Boylestad, Introductory Circuit Analysis, Inter Partes Review of U.S. Pat. No. 8,944,337, IPR Case No. IPR2016-01763, Exhibit No. 2020, exhibit filing date Jun. 21, 2017, pp. 1-3.
Boylestad, Robert L., Excerpt from Introductory Circuit Analysis, 2007, Inter Partes Review of U.S. Pat. No. 8,944,337, IPR Case No. IPR2016-01763, Exhibit No. 1053, exhibit filing date Nov. 17, 2017, pp. 1-4.
Clifford, How to Read Circuit Diagrams and Electronic Graphs, Inter Partes Review of U.S. Pat. No. 8,944,337, IPR Case No. IPR2016-01763, Exhibit No. 2015, exhibit filing date Jun. 21, 2017, pp. 1-8.
Declaration of Bruce Roesner in Support of Petition, Inter Partes Review of U.S. Pat. No. 8,944,337, IPR Case No. IPR2016-01763, Exhibit No. 1001, exhibit filing date Sep. 9, 2016, pp. 1-89.
Declaration of Bruce Roesner in Support of Petitioner's Opposition to Patent Owner's Contingent Motion to Amend, Inter Partes Review of U.S. Pat. No. 8,944,337, IPR Case No. IPR2016-01763, Exhibit No. 1031, exhibit filing date Sep. 21, 2017, pp. 1-35.
Declaration of Bruce Roesner, Inter Partes Review of U.S. Pat. No. 8,944,337, IPR Case No. IPR2016-01763, Exhibit No. 1049, exhibit filing date Nov. 17, 2017, pp. 1-93.
Deposition of Jim Fischer, IPR Case No. 2016-01763, Sep. 8, 2017, Inter Partes Review of U.S. Pat. No. 8,944,337, IPR Case No. IPR2016-01763, Exhibit No. 1027, exhibit filing date Sep. 21, 2017, pp. 1-364.
EPC based RFID Item Level Tagging, Inter Partes Review of U.S. Pat. No. 8,944,337, IPR Case No. IPR2016-01763, Exhibit No. 2013, exhibit filing date Jun. 21, 2017, pp. 1-56.

(56) References Cited

OTHER PUBLICATIONS

European Patent No. 2230174, to Yoshizaki, issued Sep. 22, 2010, Inter Partes Review of U.S. Pat. No. 8,944,337, IPR Case No. IPR2016-01763, Exhibit No. 1014, exhibit filing date Sep. 9, 2016, pp. 1-23.
European Search Report issued in European Patent Application No. 09708616.9 dated May 9, 2011 (9 pages).
Excerpt from '337 file history: Apr. 4, 2014 Non-Final Rejection, Inter Partes Review of U.S. Pat. No. 8,944,337, IPR Case No. IPR2016-01763, Exhibit No. 1010, exhibit filing date Sep. 9, 2016, pp. 1-5.
Excerpt from '337 file history: Nov. 14, 2014 Notice of Allowance, Inter Partes Review of U.S. Pat. No. 8,944,337, IPR Case No. IPR2016-01763, Exhibit No. 1019, exhibit filing date Sep. 9, 2016, pp. 1-8.
Excerpt from '337 file history: Nov. 4, 2014 Response After Final Action, Inter Partes Review of U.S. Pat. No. 8,944,337, IPR Case No. IPR2016-01763, Exhibit No. 1011, exhibit filing date Sep. 9, 2016, pp. 1-9.
Excerpt from Merriam-Webster's Collegiate Dictionary (10th ed. 2002), Inter Partes Review of U.S. Pat. No. 8,944,337, IPR Case No. IPR2016-01763, Exhibit No. 1029, exhibit filing date Sep. 21, 2017, pp. 1-8.
Extended European Search Report for European Patent Application No. 16797416.1, dated Apr. 12, 2019, 8 pages.
Extended European Search Report issued in copending EP Application No. 16797416 dated Apr. 12, 2019 in 8 pages.
Finkenzeller, Klaus, Excerpts from RFID Handbook, Inter Partes Review of U.S. Pat. No. 8,944,337, IPR Case No. IPR2016-01763, Exhibit No. 2058, exhibit filing date Dec. 6, 2017, pp. 1-24.
Finkenzeller, RFID Handbook Fundamentals and Applications in Contactless Smart Cards and Identification, 2nd Ed. 1999 Copyright pages and Chapters 2-4, Inter Partes Review of U.S. Pat. No. 8,944,337, IPR Case No. IPR2016-01763, Exhibit No. 2011, exhibit filing date Dec. 22, 2016, pp. 1-154.
Fischer Declaration ISO Patent Owners Contingent Motion to Amend Claims, Inter Partes Review of U.S. Pat. No. 8,944,337, IPR Case No. IPR2016-01763, Exhibit No. 2029, exhibit filing date Jun. 21, 2017, pp. 1-51.
Fischer Declaration ISO Patent Owners Preliminary Response, Inter Partes Review of U.S. Pat. No. 8,944,337, IPR Case No. IPR2016-01763, Exhibit No. 2002, exhibit filing date Dec. 22, 2016, pp. 1-124.
Fischer Declaration ISO Patent Owners Response to Petition, Inter Partes Review of U.S. Pat. No. 8,944,337, IPR Case No. IPR2016-01763, Exhibit No. 2028, exhibit filing date Jun. 21, 2017, pp. 1-87.
Fischer Deposition Exhibit 1021—Annotated Excerpt from U.S. Pat. No. 8,944,337, Inter Partes Review of U.S. Pat. No. 8,944,337, IPR Case No. IPR2016-01763, Exhibit No. 1021, exhibit filing date Sep. 21, 2017, p. 1.
Fischer Deposition Exhibit 1022—Annotated Excerpt from U.S. Pat. No. 8,944,337, Inter Partes Review of U.S. Pat. No. 8,944,337, IPR Case No. IPR2016-01763, Exhibit No. 1022, exhibit filing date Sep. 21, 2017, p. 1.
Fischer Deposition Exhibit 1023—Annotated Excerpt from U.S. Pat. No. 8,944,337, Inter Partes Review of U.S. Pat. No. 8,944,337, IPR Case No. IPR2016-01763, Exhibit No. 1023, exhibit filing date Sep. 21, 2017, p. 1.
Fischer Deposition Exhibit 1024—Annotated Excerpt from U.S. Pat. No. 8,944,337, Inter Partes Review of U.S. Pat. No. 8,944,337, IPR Case No. IPR2016-01763, Exhibit No. 1024, exhibit filing date Sep. 21, 2017, p. 1.
Fischer Deposition Exhibit 1025—U.S. Patent Application Publication No. US 2010/0283690 A1 to Artigue et al., Inter Partes Review of U.S. Pat. No. 8,944,337, IPR Case No. IPR2016-01763, Exhibit No. 1025, exhibit filing date Sep. 21, 2017, pp. 1-12.
Fischer Deposition Exhibit 1026—Handwritten Diagram, Inter Partes Review of U.S. Pat. No. 8,944,337, IPR Case No. IPR2016-01763, Exhibit No. 1026, exhibit filing date Sep. 21, 2017, p. 1.
Fischer Deposition Exhibit 1035A: Model, Inter Partes Review of U.S. Pat. No. 8,944,337, IPR Case No. IPR2016-01763, Exhibit No. 1035A, exhibit filing date Nov. 17, 2017, p. 1.
Glossary of RFID Terms May 22, 2013, Inter Partes Review of U.S. Pat. No. 8,944,337, IPR Case No. IPR2016-01763, Exhibit No. 2033, exhibit filing date Jun. 21, 2017, pp. 1-3.
Holt et al., Physics 1999, Inter Partes Review of U.S. Pat. No. 8,944,337, IPR Case No. IPR2016-01763, Exhibit No. 2032, exhibit filing date Jun. 21, 2017, pp. 1-4.
Instructables: Pull Out Birthday Card, Inter Partes Review of U.S. Pat. No. 8,944,337, IPR Case No. IPR2016-01763, Exhibit No. 1030, exhibit filing date Sep. 21, 2017, pp. 1-6.
International Publication No. 2008/074050 A1, to Peter Samuel Atherton, Inter Partes Review of U.S. Pat. No. 8,944,337, IPR Case No. IPR2016-01763, Exhibit No. 1006, exhibit filing date Sep. 9, 2016, pp. 1-21.
International Search Report and Written Opinion for PCT/US2016/033636, dated Aug. 30, 2016 (13 pages).
International Search Report and Written Opinion issued in International Patent Application No. PCT/US2009/032840 dated May 26, 2009 (6 pages).
International Search Report and Written Opinion issued in International Patent Application No. PCT/US2016/045069 dated Oct. 21, 2016 (11 pages).
Jamaluddin et al., Microstrip Dipole Antenna Analysis with Different Width and Length at 2.4 GHz, Dec. 2005, Inter Partes Review of U.S. Pat. No. 8,944,337, IPR Case No. IPR2016-01763, Exhibit No. 2047, exhibit filing date Oct. 19, 2017, pp. 1-4.
Johnson et al., Introductory Electric Circuit Analysis, Inter Partes Review of U.S. Pat. No. 8,944,337, IPR Case No. IPR2016-01763, Exhibit No. 2018, exhibit filing date Jun. 21, 2017, pp. 1-12.
Kaplan, Steven M., Excerpt from Wiley Electrical and Electronics Engineering Dictionary (2004 ), Inter Partes Review of U.S. Pat. No. 8,944,337, IPR Case No. IPR2016-01763, Exhibit No. 1028, exhibit filing date Sep. 21, 2017, pp. 1-4.
Keyrouz et al., Novel Empirical Equations to Calculate the Impedance of a Strip Dipole Antenna, Dec. 2013, Inter Partes Review of U.S. Pat. No. 8,944,337, IPR Case No. IPR2016-01763, Exhibit No. 2046, exhibit filing date Oct. 19, 2017, pp. 1-4.
Kraus, John D., Excerpts from Antennas 2nd Ed., Inter Partes Review of U.S. Pat. No. 8,944,337, IPR Case No. IPR2016-01763, Exhibit No. 2051, exhibit filing date Oct. 19, 2017, pp. 1-8.
Lee et al., Designing Antenna Booster Cases for Mobile Phones using Capacitive Coupling Techniques 2015, Inter Partes Review of U.S. Pat. No. 8,944,337, IPR Case No. IPR2016-01763, Exhibit No. 2008, exhibit filing date Dec. 22, 2016, pp. 1-2.
Lehpamer, Harvey, Excerpts from RFID Design Principles, Inter Partes Review of U.S. Pat. No. 8,944,337, IPR Case No. IPR2016-01763, Exhibit No. 2057, exhibit filing date Dec. 6, 2017, pp. 1-14.

\* cited by examiner

DETACHABLE RADIO FREQUENCY IDENTIFICATION SWITCH TAG

RELATED APPLICATION INFORMATION

This patent application claims the benefit under 35 U. S. C. § 119 (e) to U.S. Provisional Application No. 62/757,018, filed Nov. 7, 2018, and is a Continuation-in-Part of U.S. Non-Provisional application Ser. No. 16/365,465 filed Mar. 26, 2019, which in turn is a Continuation of U.S. Non-Provisional application Ser. No. 15/160,982 filed May 20, 2016, now issued as U.S. Pat. No. 10,339,436 on Jul. 20, 2019, which claims the benefit under 35 U. S. C. § 119 (e) to U.S. Provisional Application No. 62/165,167, filed May 21, 2015, the disclosure of which is incorporated herein by reference in its entirety.

BACKGROUND

1. Technical Field

The various embodiments described herein generally relate to radio frequency identification (RFID) systems and more particularly to an RFID switch tag that can be used for multiple applications.

2. Related Art

RFID technology harnesses electromagnetic fields to transfer data wirelessly. One of the primary uses for RFID technology is the automatic identification and tracking of objects via RFID tags, which may be attached or incorporated into a variety of objects. Examples include credit cards, passports, license plates, identity cards, cellphones/mobile devices, etc. RFID technology also has applications in numerous areas, including, but not limited to, electronic tolling, parking access, border control, payment processing, asset management, and transportation. Thus, for example, a license plate that includes an RFID tag may be used for the purposes of electronic toll collection (ETC), electronic vehicle registration (EVR), border crossing etc.

Different RFID applications may require different operation frequencies. For example, ultra high frequency (UHF) readers and transponder tags (e.g., operating at 915 megahertz (MHz) or 2.45 gigahertz (GHz)) provide greater read distances and faster data transfer rates, and are thus commonly deployed in ETC systems. In contrast, contactless payment systems may be implemented using high frequency (HF) or near field communication (NFC) readers and transponders (e.g., operating at 13.56 MHz), which tend to exhibit greater field penetration than UHF systems. However, the construction of a conventional RFID tag has limited flexibility to support operation in multiple frequencies.

SUMMARY

Embodiments described herein provide various designs of a radio frequency identification (RFID) tag which includes a base component and a detachable component so that the RFID tag can be configured in multiple configurations to support operations in multiple frequencies.

According to an aspect, a radio frequency identification (RFID) switch tag is disclosed. This RFID switch tag includes a base component having an ultra-high frequency (UHF) booster, such as an UHF booster antenna, and a detachable component having at least one UHF RFID module and a high frequency (HF) RFID module, such as a near-field communication (NFC) tag.

According to another aspect, the detachable component is positioned in close proximity to the base component in a first configuration of the RFID switch tag such that the at least one UHF RFID module is sufficiently coupled to the UHF booster in the base component to form an UHF RFID system having a desired performance, such as a desired operating range of the UHF RFID system. In some embodiments, the detachable component is separated from the base component to obtain a second configuration of the RFID switch tag, and the HF RFID module remains functional within the detached detachable component so that the detachable component can be used as a standalone HF RFID tag. Moreover, in the second configuration, the at least one UHF RFID module is decoupled from the UHF booster in the base component to render the at least one UHF RFID module nonfunctional.

According to still another aspect, the detachable component can be detached from the base component to obtain a second configuration of the RFID switch tag such that the HF RFID module remains functional within the detached detachable component. The HF RFID module can be used as a near-field communication (NFC) tag in a second RFID application which requires an NFC operating range.

According to still another aspect, the RFID switch tag can be placed within a vehicle to serve as an RFID tag in an electronic toll collection (ETC) application.

According to still another aspect, the first RFID application is a first ETC application for high occupancy vehicle (HOV) lanes and the second RFID application is a second ETC application for single occupancy vehicle (SOV) lanes.

Other features and advantages of the present inventive concept should be apparent from the following description which illustrates by way of example aspects of the present inventive concept.

BRIEF DESCRIPTION OF THE DRAWINGS

The embodiments described herein will be understood from a review of the following detailed description and the accompanying drawings in which like reference numerals refer to like parts and in which.

DETAILED DESCRIPTION

While certain embodiments are described, these embodiments are presented by way of example only, and are not intended to limit the scope of protection. The methods and systems described herein may be embodied in a variety of other forms. Furthermore, various omissions, substitutions, and changes in the form of the example methods and systems described herein may be made without departing from the scope of protection.

The embodiments described herein provide various designs of multi-frequency radio frequency identification (RFID) tags and modules that are compact in size, can be portable, can be used in multiple applications, and that can provide tamper-proofing capability. Certain embodiments of the multi-frequency tags described herein can include both a high frequency (HF) subsystem and an ultra-high frequency (UHF) subsystem. The HF subsystem and the UHF subsystem can share a common integrated circuit (IC) chip and a common substrate. The HF subsystem can further include a HF loop antenna coupled to the IC chip. The UHF subsystem can further include a coupling antenna electrically coupled to the IC chip but electrically isolated from the HF loop antenna. Moreover, the HF loop antenna and the coupling antenna can form a nested structure, and as such, the substrate, the IC chip, the HF loop antenna and the coupling antenna form a compact RFID module. The UHF subsystem can also include an UHF antenna having a region, such as an aperture to receive the RFID module. When the RFID module is positioned in the aperture of the UHF antenna, the UHF antenna is then coupled to the IC chip in the RFID module via the coupling antenna, thereby forming the UHF subsystem. However, when the RFID module is removed from the aperture of the UHF antenna, the UHF subsystem is rendered inoperable.

In certain other embodiments, the UHF subsystem can simply comprise the UHF antenna coupled with the IC.

It should be noted that while particular embodiments of RFID modules and tags are described herein, the RFID functionality described can be incorporated into other forms and devices. For example, a dual frequency RFID module can be in the form of a card or a rectangular module, or even a mobile device.

Figure 1:
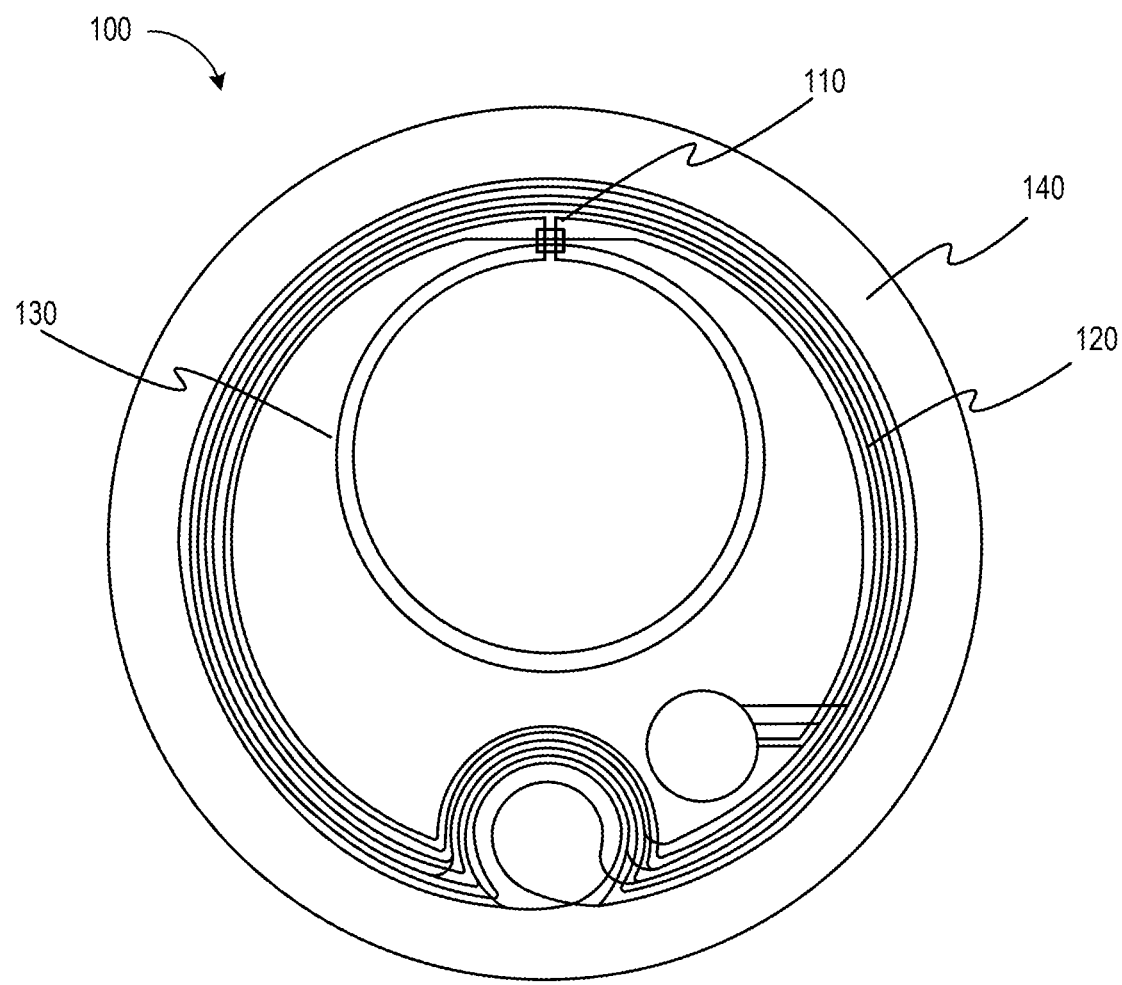
FIG. 1 shows a top-view illustration of an exemplary multi-frequency radio frequency identification (RFID) module in accordance with some embodiments described herein.

FIG. 1 shows a top-view illustration of an exemplary multi-frequency radio frequency identification (RFID) module 100 in accordance with one embodiment described herein. As illustrated in FIG. 1, the multi-frequency RFID module 100 includes an integrated circuit (IC) chip 110 (or "chip 110" hereinafter), a high frequency (HF) antenna 120, and an UHF loop 130. Chip 110 can include a memory (not shown) and other circuits. A more detailed embodiment of chip 110 is provided below in conjunction with FIG. 2.

Multi-frequency RFID module 100 can also include a substrate 140, which provides structural supports for chip 110, HF antenna 120 and UHF loop 130. In various embodiments, chip 110, HF antenna 120 and UHF loop 130 can be deposited or fabricated on substrate 140. In the embodiment of multi-frequency RFID module 100, UHF antenna 130 can, as illustrated in FIG. 1, be positioned substantially inside the loops of HF antenna 120. In some embodiments, HF antenna 120 is tuned to operate at a desired high frequency, such as 13.56 MHz. Tuning of HF antenna 120 can be achieved in conjunction with chip 110, which is described in more detail below with respect to FIG. 2. UHF loop 130 can also be tuned to operate at a desired ultra-high frequency, such as 915 MHz or 2.45 GHz. In certain embodiments, UHF loop 130 can be an UHF antenna by itself and thus form a UHF sub-system with chip 110. In other embodiments, UHF loop 130 can be implemented as a coupling means for coupling chip 110 to a separate UHF antenna. One embodiment in which chip 110 is coupled to an external UHF antenna via UHF loop 130 is provided below in conjunction with FIG. 3.

In the exemplary embodiment shown in FIG. 1, HF antenna 120 is configured as a loop antenna that includes multiple circular loops; however, in other embodiments, HF antenna 120 can be constructed with non-circular-shaped loops, such as rectangular loops. Similarly, while the loops in UHF loop 130 are shown to be circular, UHF loop 130 can also be constructed with non-circular-shaped loops, such as rectangular loops without departing from the scope of the present inventive concept. Further, while UHF loop 130 is shown to include two circular loops in the example of FIG. 1, in other embodiments, UHF loop 130 can include a single loop or more than two loops.

In some embodiments, chip 110 of multi-frequency RFID module 100 can be frequency-independent. For example, chip 110 can be configured to interface with both HF (e.g., NFC) and UHF systems. Thus, chip 110 can perform functions associated with both HF and UHF systems including, but not limited to, encoding/decoding, modulation/demodulation, digital and analog processing, and data storage. Although multi-frequency RFID module 100 uses a single IC chip 110 for operating with different frequencies, more than one IC chip can be used to implement functions associated with systems operating at different frequencies.

In various embodiments, HF antenna 120 can be coupled to chip 110 to form a HF sub-system. HF antenna 120 can be tuned to operate in a HF range (e.g., at 13.56 MHz). According to one exemplary embodiment, HF antenna 120 can be coupled to chip 110 using a bridging technique. In some embodiments, HF antenna 120 is constructed from etched aluminum. Hence, HF antenna 120 can be connected to chip 110 by crimping through layers (e.g., aluminum) of the HF antenna 120 and chip 110.

In some embodiments, HF antenna 120 can be coupled to chip 110 by depositing (e.g., printing) dielectric and conductive inks over the HF antenna 120. For example, coils or loops that form antenna 120 can be constructed using conductive ink. The ends of the HF antenna 120 can be connected with chip 110 using dielectric ink deposited over the inner coils to prevent short-circuiting while conductive ink can be deposited over the dielectric ink to create a jumper over the dielectric ink to connect the outer coils to the chip 110.

UHF loop 130 can also be coupled to chip 110. According to one exemplary embodiment, UHF loop 130 can be positioned inside the HF antenna 120. In this nested configuration, multi-frequency RFID module 100 can be more physically compact and require a smaller aperture in a corresponding external antenna as will be described in more details below in conjunction with FIG. 3. Moreover, because multi-frequency RFID module 100 also has a circular-shaped substrate 140 to support circular-shaped HF and UHF antennas 120 and 130, the overall construction of RFID module 100 provides a highly compact RFID system. In certain embodiments, HF antenna 120 can be positioned inside of the UHF loop 130.

Figure 2:
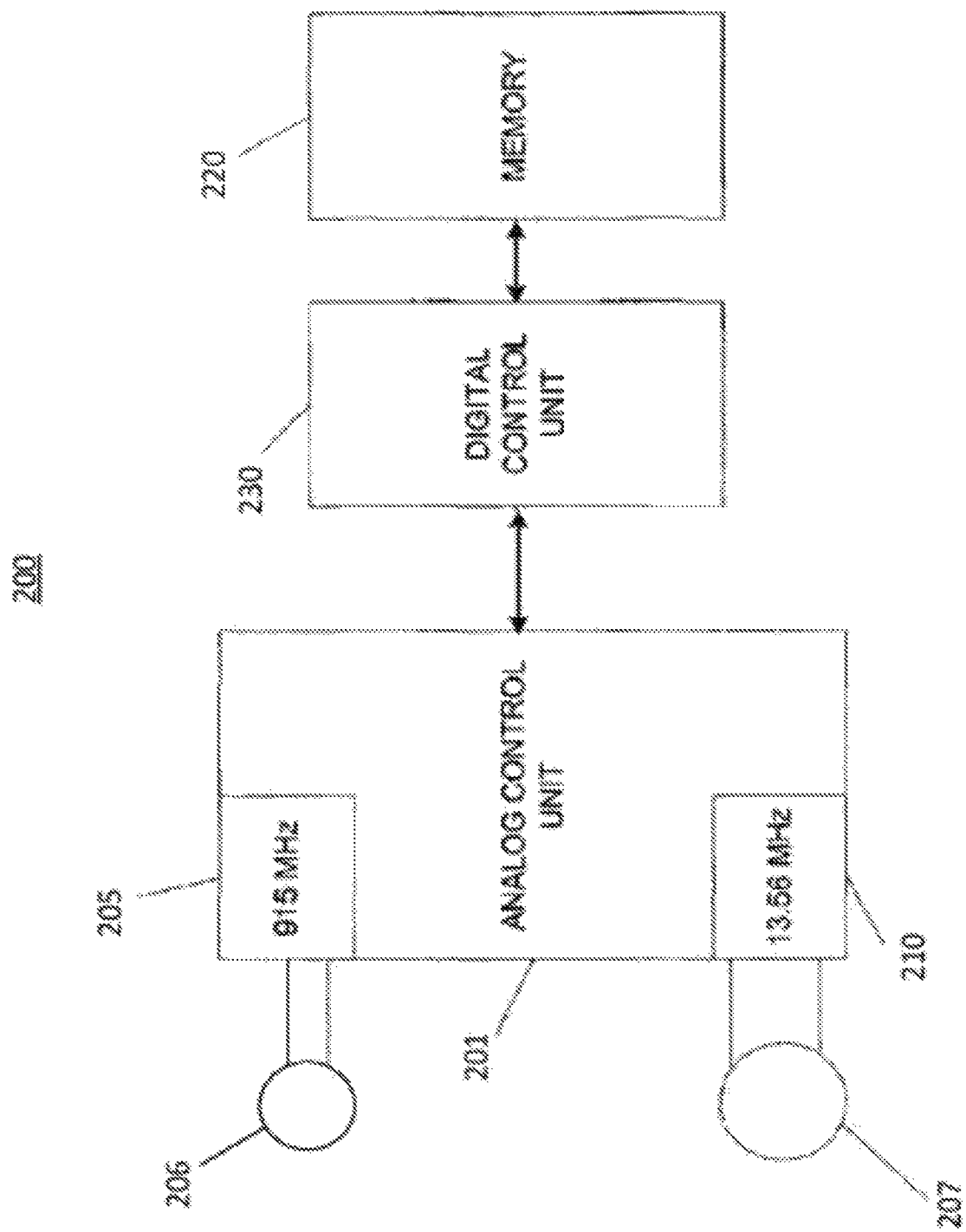
FIG. 2 shows a block diagram of a chip structure which is an exemplary implementation of the RFID chip described in FIG. 1 in accordance with some embodiments described herein.

FIG. 2 shows a block diagram of a chip 200, which is an exemplary implementation of chip 110 described in FIG. 1 in accordance with one embodiment described herein. This example is used merely to illustrate the architectural overview of an exemplary embodiment of chip 110.

As can be seen in FIG. 2, chip comprises a radio front end that includes an analog control unit 201 that can comprise an HF interface 210 and a UHF interface 205, which can interface with antenna 207 and 206 respectively. Interfaces 210 and 205 can include the matching that allows the front end to be tuned for operation at both HF, e.g., 13.56 MHz and UHF, e.g., 915 MHZ or 2.45 GHz, respectively. In some embodiments, the UHF interface 205 is used, for example, for a data reading function that enables high data rate. In one embodiment, the UHF interface 205 is coupled to a UHF loop 206 as described above in conjunction with FIG. 1. In some embodiments, the HF interface 210 is used for the writing (e.g., personalization) of identification information into the memory of chip 200. In one embodiment, the HF interface 210 is coupled to a coil antenna 207 (e.g., a wound spiral of insulated wire) as described above in conjunction with FIG. 1.

In one embodiment, the chip 200 can be a frequency-independent chip. In this case, a single manufactured silicon chip, when properly connected and matched to an appropriate antenna, will operate at any of the relevant frequencies assigned for the dual-frequency interface, comprising interfaces 205 and 210 and analog control unit 201. In other embodiments, chip 200 can also be a one-frequency or multi-frequency chip. In these cases, the chip is uniquely designed and characterized to operate with a specific antenna at one or a few specific frequencies.

Chip 200 can also include a digital or baseband portion that includes a memory 220 and a digital control unit 230 coupled between the analog control unit 201 and memory 220. Digital control unit 230 can include circuits to perform functions such as A/D conversion, encoding/decoding, modulation/demodulation, and other digital signal processing functions. Memory 220 is typically used to store identification information, and possibly other information, such as account information, identifying information, etc., which can be accessed and possibly updated via command signals received via the control units 205 and 210 and dual-frequency of analog control unit 201.

In some embodiments, access to the memory 220 can be granted based on a security key in accordance with the provision of secure identification solutions for RFID tags as described in U.S. Pat. Nos. 7,081,819, 7,671,746, 8,237,568, 8,322,044, and 8,004,410, the disclosures of which are incorporated by reference herein in their respective entirety.

Memory 220 can store the information needed to implement one or more protocols associated with one or more applications. In certain embodiments, a particular application can be configured to work with command signals sent over one of multiple frequencies received via the radio frequency front end. In other applications, a particular application can be configured to work with command signals received over a single frequency.

One application can be for electronic vehicle registration. In such an application, vehicle registration information can be read from and written to, or updated within the module 100. To read identification information, it is preferable to have a read distance of more than 3 meters, which can be achieved with an UHF interface (e.g., 915 MHz) integrated with the identification module 100. To write or update the vehicle or other information, however, a shorter distance is sufficient, because the write cycle is typically performed only by local authorities in a nearby office. In fact the shorter distance can be preferable for security reasons. Hence, writing information can be achieved with a HF interface (e.g., 13.56 MHz) integrated with the identification module 100. The write cycle, using the HF interface (e.g., 13.56 MHz), can need to be more secure than the read cycle in order to prevent illegal changing of the data.

Figure 3:
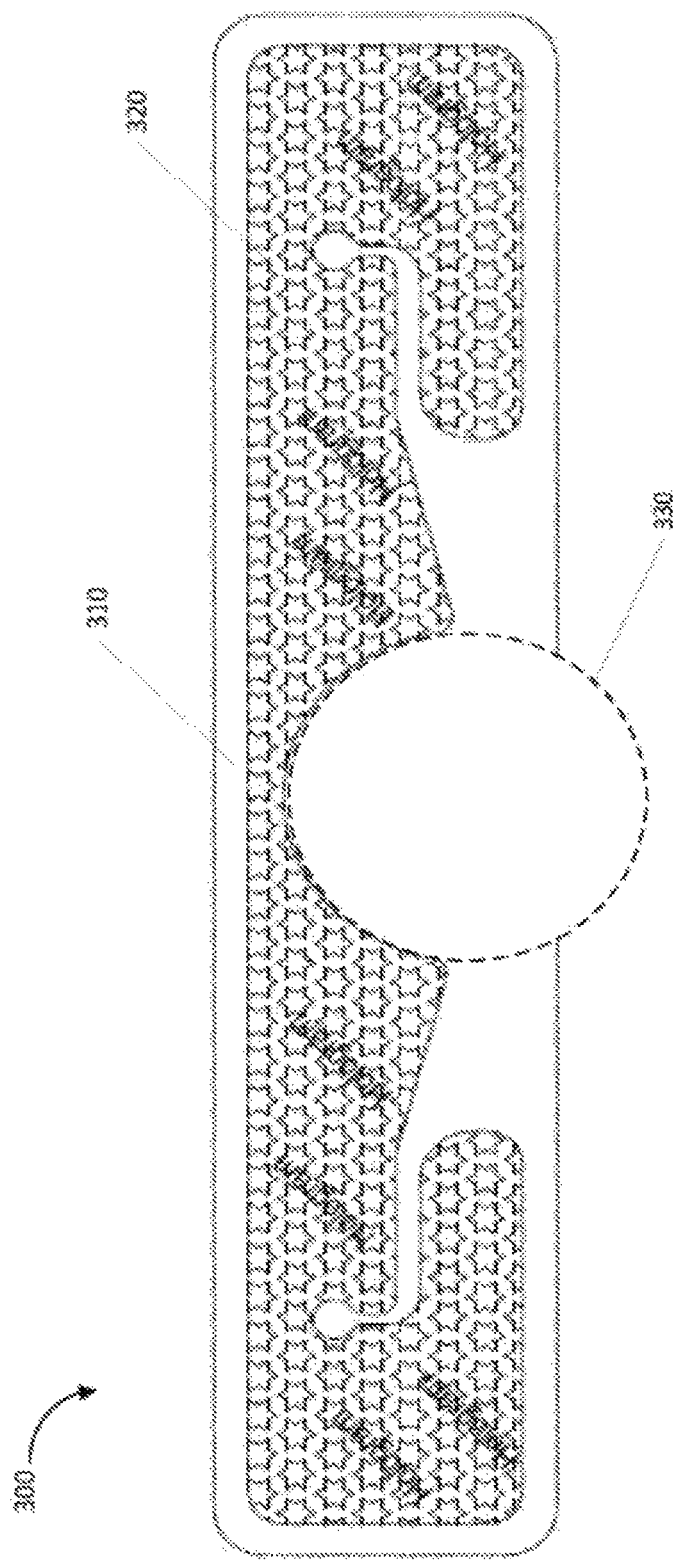
FIG. 3 shows a top-view illustration of an exemplary antenna in accordance with some embodiments described herein.

Because, as explained below, module 100 can be a portable device, it can actually be removed and written remotely from the vehicle with which it is associated. As such, in certain embodiments, a multi-frequency RFID module can include a detachable RFID module 100. For example, FIG. 3 shows a top-view illustration of an exemplary antenna 300 that can, along with, e.g., module 100, form a multi-frequency RFID module in accordance with one embodiment. As can be seen in FIG. 3, antenna 300 can include a substrate 310, an antenna pattern 320, and an aperture 330, which can have a circular shape. In some embodiments, aperture 330 goes through substrate 310. While aperture 330 is shown to have circular shape, other embodiments of antenna 300 can include apertures having shapes other than circular. In various embodiments, antenna 300 can be tuned to operate in an UHF range (e.g., at 915 MHz or 2.45 GHz). In various embodiments, antenna 300 can be configured as a dipole antenna.

In some embodiments, aperture 330 in antenna 300 is configured to receive multi-frequency RFID module 100 described in FIG. 1 (not shown in FIG. 3). In these embodiments, when multi-frequency RFID module 100 is positioned inside aperture 330, antenna 300 can be coupled to chip 110, for example, through the corresponding UHF loop 130. In one embodiment, antenna 300 is inductively coupled to chip 110 via the inductive coupling between antenna 300 and UHF loop 130. In other embodiments, however, antenna 300 can be capacitively coupled to chip 110, or by electrical connection between antenna 300 and UHF loop 130.

In the embodiment shown in FIG. 3, antenna 300 is configured as a hologram antenna that is constructed from a holographic material 320. In specific embodiments, antenna 300 can be a hologram UHF dipole antenna. A holographic antenna 300 can be manufactured using a physical vapor deposition (PVD) technique provided by, for example, Hueck Folien GmbH of Austria.

While FIG. 3 illustrates a holographic antenna, antenna 300 can also be constructed from a mesh of conductor lines or a plurality of conductors (e.g., using poly (3,4-ethylene-dioxythiophene) (PEDOT) and indium tin oxide (ITO)). Other materials and methods for creating antenna 300 can be used as appropriate.

Figure 4:
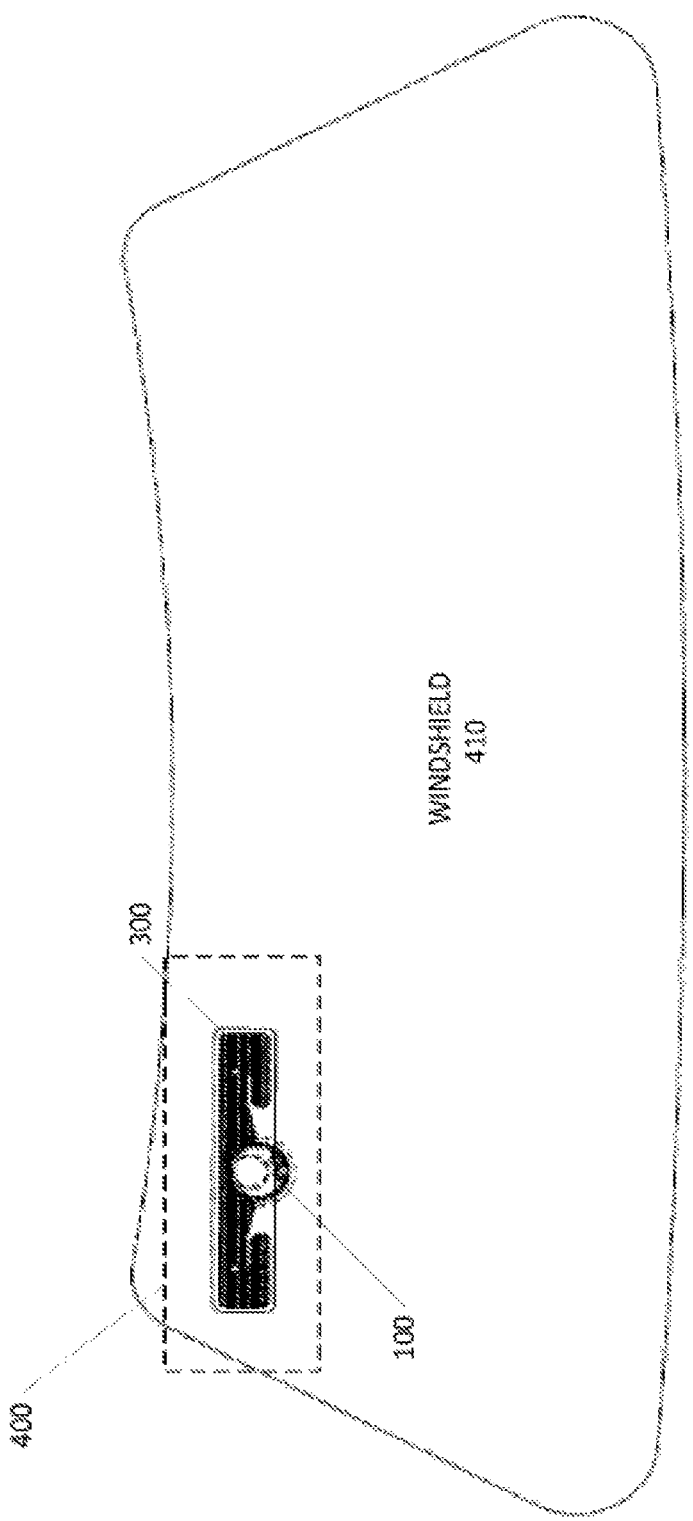
FIG. 4 shows a top-view illustration of an exemplary multi-frequency RFID tag in accordance with some embodiments described herein.

FIG. 4 shows a top-view illustration of an exemplary multi-frequency RFID tag 400 in accordance with some embodiments described herein. In a particular embodiment, multi-frequency RFID tag 400 is formed by combining antenna 300 described in conjunction with FIG. 3 with multi-frequency RFID module 100 described in conjunction with FIG. 1, e.g., by placing multi-frequency RFID module 100 within the aperture of antenna 300. In this embodiment, multi-frequency RFID module 100 in multi-frequency RFID tag 400 includes chip 110, HF coil antenna 120, and UHF loop 130, and chip 110 is coupled to both HF coil antenna 120 and UHF loop 130. Meanwhile, UHF loop 130 is coupled, for example, inductively to antenna 300. As such, chip 110 is also coupled to antenna 300 via UHF loop 130. Hence, if antenna 300 is configured as an UHF antenna, multi-frequency RFID tag 400 can operate both in a HF n frequency mode by way of the system formed by chip 110 and HF coil antenna 120, and in UHF frequency mode by way of the system formed by chip 110 and UHF antenna 300.

According to one exemplary embodiment, removing multi-frequency RFID module 100 from the aperture area of antenna 300 can disable at least some of the functionalities of the multi-frequency RFID tag 400. For example, when antenna 300 is configured as an UHF antenna, removing multi-frequency RFID module 100 from the antenna 300 decouples chip 110 and UHF loop 130 from UHF antenna 300. Consequently, the multi-frequency RFID tag 400, which is missing the IC chip 110, may be unable to operate as an UHF system. This detachable configuration of the multi-frequency RFID tag 400 provides a tamper-proofing mechanism when the multi-frequency RFID tag 400 is likely to be tampered with, for example, when multi-frequency RFID tag 400 is placed on an unintended vehicle. In such situations, the user can simply detach the multi-frequency RFID module 100 from the multi-frequency RFID tag 400 to render the multi-frequency RFID tag 400 inoperable.

According to one exemplary embodiment, the multi-frequency RFID tag 400 can serve as a windshield tag. In the embodiment shown in FIG. 4, the multi-frequency RFID tag 400 is also attached to a vehicle's windshield 410 using, for example, adhesives (e.g., adhesive strips).

Multi-frequency RFID tags are also described in Reissued U.S. Pat. Nos. RE 43,355 and RE 44,691, the disclosures of which are incorporated by reference herein in their respective entirety.

Some applications may require a placement of metallic material (e.g., retro-reflective material, holographic image) over the multi-frequency RFID tag 400. In order to preserve the transmission and reception capabilities of the multi-frequency RFID tag 400, a selective de-metallization process may be employed to treat the metallic material. Selective de-metallization is described in U.S. Pat. Nos. 7,034,688 and 7,463,154, the disclosures of which are incorporated by reference herein in their respective entirety.

According to one exemplary embodiment, the multi-frequency RFID tag 400 can be used to in one or more account management applications. For example, the multi-frequency RFID tag 400 can be used to track a vehicle for purposes of electronic tolling, parking access, and border control. At least some applications for the multi-frequency RFID tag 400 are described in U.S. patent application Ser. No. 14/459,299, now U.S. Pat. No. 9,355,398, the disclosure of which is incorporated herein by reference in its entirety. The '398 patent describes embodiments where one frequency in a dual frequency implementation can be used for, e.g., a tolling application, while the other frequency is used to replenish an account associated with the application.

As noted above, module 100 can be used in a similar manner; however, in addition, module 100 can also be used with multiple applications, e.g., tolling and EVR. Moreover, due to the portable nature of module 100 it can be used in numerous disparate applications. For example, while installed on a windshield, or in a license plate such as described in the '398 application, the module 100 and corresponding tag 400, can be used for tolling and account management as described in the '398, for EVR as described above, or both. But module 100 can be removed from tag 400 and taken with the driver, who can then use, e.g., for access a transportation system, such as bus, subway, train, etc., or some combination thereof.

This can be accomplished by interfacing or inserting module 100 into a substrate, such as an access or identity card. In other embodiments, such a card can actually form module 100. In other words, the driver or user may have a card, or other device, that allows them to access a public transit system, but that can also be interfaced with an antennae affixed, e.g., to a windshield so that the user can use the same card or device for, e.g., tolling. In such an embodiment, the HF, e.g., NFC capabilities can be used in the transit system and the UHF capabilities can be enabled when the device is interfaced with the antenna in the car for, e.g., tolling.

But in other embodiments, the HF function can also be used when the device is interfaced in the car, e.g., for account management or EVR functions as described. Thus, the HF portion would be used for more than one application depending on the setting.

While various examples of the multi-frequency RFID tags described above are based on dual-frequency RFID tags having an HF subsystem and an UHF subsystem, a person having ordinary skill in the art can appreciate that the disclosed multi-frequency RFID tags can have more than two frequency subsystems. For example, the disclosed multi-frequency RFID tags can include three or more frequency subsystems, including three of more of the following: a HF subsystem, a very high frequency (VHF) subsystem, an UHF subsystem, a super high frequency (SHE) subsystem, and an extremely high frequency (EHF) subsystem. Moreover, in the scope of dual-frequency RFID tags, the two frequency modes can be other than just the HF and UHF modes without departing from the scope of the present inventive concept.

Various embodiments described herein provide various designs of a radio frequency identification (RFID) tag which includes at least one base component and a detachable component such that the RFID tag can be configured in multiple configurations to support operations in multiple frequencies. In one aspect, a radio frequency identification (RFID) switch tag is disclosed. This RFID switch tag includes a base component having an ultra-high frequency (UHF) booster, such as an UHF booster antenna, and a detachable component having at least one UHF RFID module and a high frequency (HF) RFID module, such as a near-field communication (NFC) tag. In some embodiments, the detachable component is positioned in close proximity to the base component in a first configuration of the RFID switch tag such that the at least one UHF RFID module is sufficiently coupled to the UHF booster in the base component to form an UHF RFID system having a desired performance, such as a desired operating range of the UHF RFID system. In some embodiments, the detachable component is separated from the base component to obtain a second configuration of the RFID switch tag in which the HF RFID module remains functional within the detached detachable component so that the detachable component can be used as a standalone HF RFID tag. Moreover, in the second configuration, the at least one UHF RFID module is decoupled from the UHF booster in the base component to render the at least one UHF RFID module nonfunctional.

According to other embodiments, a technique for using an RFID switch tag that includes a base component and a detachable component is disclosed, wherein the base component further includes an ultra-high frequency (UHF) booster and the detachable component further includes at least one UHF RFID module and a high frequency (HF) RFID module. This technique can include positioning the detachable component in close proximity to the base component in a first configuration of the RFID switch tag such that the at least one UHF RFID module in the detachable component is sufficiently coupled to the UHF booster in the base component to form an UHF RFID tag having a desired operating range longer than an operating range of the at least one UHF RFID module. The technique further includes using the UHF RFID tag in a first RFID application, which requires the desired operating range. In some embodiments, the technique also includes detaching the detachable component from the base component to obtain a second configuration of the RFID switch tag such that the HF RFID module remains functional within the detached detachable component. The technique additionally includes using the HF RFID module as a near-field communication (NFC) tag in a second RFID application which requires an NFC operating range.

Figure 5:
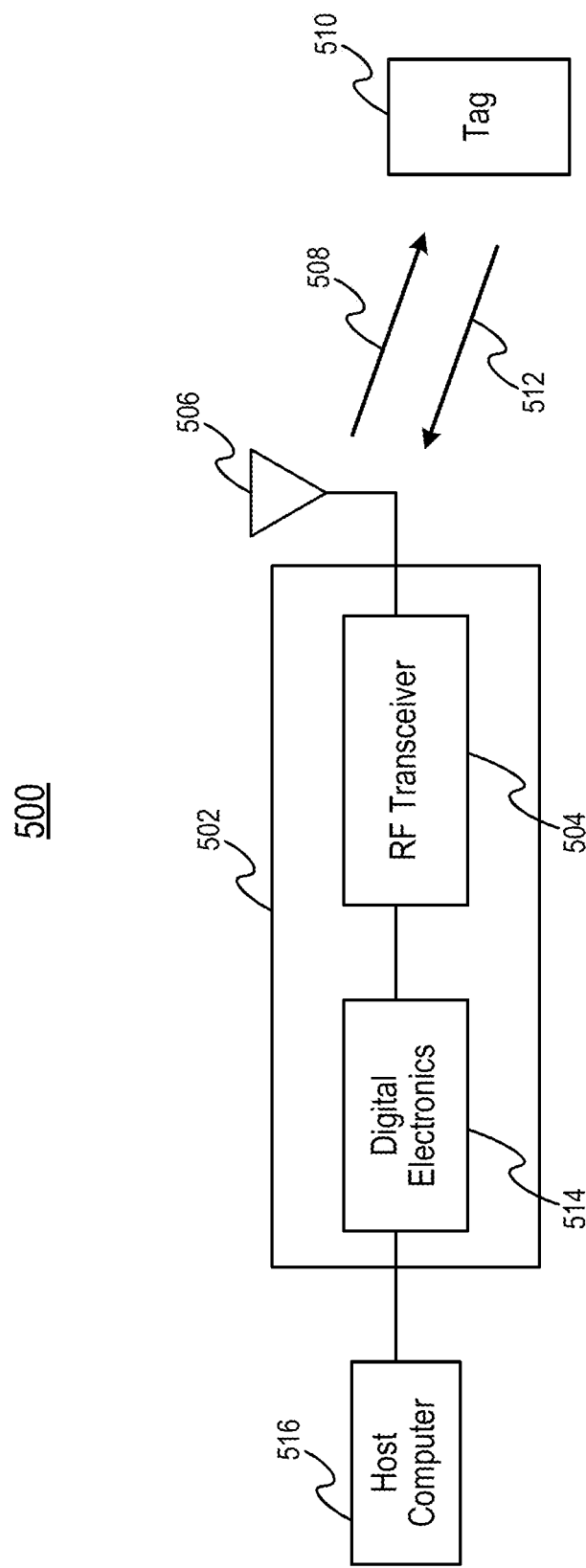
FIG. 5 shows a diagram illustrating an exemplary RFID system in accordance with one embodiment described herein.

FIG. 5 shows a diagram illustrating an exemplary RFID system 500 in accordance with one embodiment described herein. In system 500, RFID interrogator 502 communicates with one or more RFID tags 510. Data can be exchanged between interrogator 502 and RFID tag 510 via radio transmit signal 508 and radio receive signal 512. RFID interrogator 502 comprises RF transceiver 504, which contains transmitter and receiver electronics, and antenna 506, which are configured to generate and receive radio transit signal 508 and radio receive signal 512, respectively. Exchange of data can be accomplished via electromagnetic or electrostatic coupling in the RF spectrum in combination with various modulation and encoding schemes.

RFID tag 510 is a transponder that can be attached to an object of interest and act as an information storage mechanism. In many applications, the use of passive RFID tags is desirable, because they have a virtually unlimited operational lifetime and can be smaller, lighter, and cheaper than active RFID tags that contain an internal power source, e.g. battery. Passive RFID tags power themselves by rectifying the RF signal emitted by the RF scanner. Consequently, the range of transmit signal 508 determines the operational range of RFID tag 510.

RF transceiver 504 transmits RF signals to RFID tag 510, and receives RF signals from RFID tag 510, via antenna 506. The data in transmit signal 508 and receive signal 512 can be contained in one or more bits for the purpose of providing identification and other information relevant to the particular RFID tag application. When RFID tag 510 passes within the range of the radio frequency magnetic field emitted by antenna 506, RFID tag 510 is excited and transmits data back to RF interrogator 502. A change in the impedance of RFID tag 510 can be used to signal the data to RF interrogator 502 via receive signal 512. The impedance change in RFID tag 510 can be caused by producing a short circuit across the tag's antenna connections (not shown) in bursts of very short duration. RF transceiver 504 senses the impedance change as a change in the level of reflected or backscattered energy arriving at antenna 506.

Digital electronics 514, which can comprise a microprocessor with RAM, performs decoding and reading of receive signal 512. Similarly, digital electronics 514 performs the coding of transmit signal 508. Thus, RF interrogator 502 facilitates the reading or writing of data to RFID tags, e.g. RFID tag 510 that are within range of the RF field emitted by antenna 504. Together, RF transceiver 504 and digital electronics 514 comprise reader 518. Finally, digital electronics 514 and can be interfaced with an integral display and/or provide a parallel or serial communications interface to a host computer or industrial controller, e.g. host computer 516.

Figure 6:
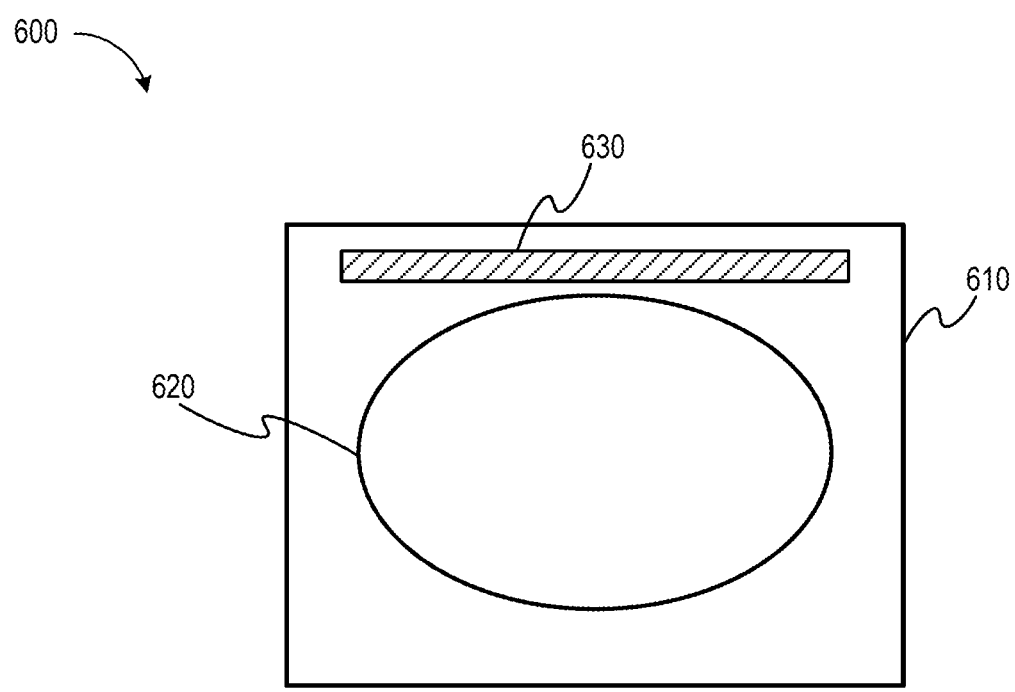
FIG. 6 shows a top-view illustration of an exemplary RFID switch tag in an attached configuration in accordance with one embodiment described herein.

FIG. 2 shows a top-view illustration of an exemplary RFID switch tag 200 in an attached configuration in accordance with one embodiment described herein. In some embodiments, RFID switch tag 200 is used to implement RFID tag 510 in RFID system 500 shown in FIG. 5. As illustrated in FIG. 6, RFID switch tag 600 includes a base component 610 and a detachable component 620. In some embodiments, base component 610 includes an UHF booster 630, such as a booster antenna. Note that UHF booster 630 can include a passive booster, an active booster, or a battery-assisted passive booster. The detachable component 620 can include at least one UHF RFID module and an HF RFID module or tag. In particular embodiments, the at least one HF RFID module included in detachable component 620 is a near field communication (NFC) module. In some embodiments, the UHF RFID module and the HF RFID module share a common integrated circuit (IC) chip. In these embodiments, detachable component 620 essentially acts as a dual-frequency RFID tag.

The reference to a HF or UHF tag is intended to indicate that the HF or UHF module included in detachable component 620 comprise all the components necessary to perform the functions of a RFID tag, such as described with respect to tag 510 in FIG. 5. As noted, in certain embodiments, the modules can share components such as the IC, or portions of the IC and potentially the antenna. Although, sharing of the antenna or any components can depend on the frequency of operation, the required matching impendence, the protocols being used, etc.

Although the embodiment of FIG. 6 shows that detachable component 620 is positioned substantially in the middle of base component 610, other embodiments can have detachable component 620 placed in a non-centered position relative to base component 610. When placed near the base component 610, the UHF module can be configured such that it will inductively couple with the UHF booster antenna 630 in the base component 610.

In one exemplary embodiment, the at least one UHF RFID module included in detachable component 620 is coupled with UHF booster antenna 630 included in base component 610 to form an UHF RFID system of desire performances. For example, the desired performances include a desired operating range for the UHF RFID system. In one embodiment, an UHF coupling antenna within the at least one UHF RFID module in detachable component 620 is positioned in a manner to ensure a sufficient amount of coupling, such as an inductive coupling, a capacitive coupling, or both, between the UHF coupling antenna in detachable component 620 and UHF booster antenna 630 in base component 610. The at least one UHF RFID module and the HF RFID tag, such as an NFC tag included in the detachable component 620 can be active, passive, or battery-assisted passive without departing from the scope of the inventive concept of this disclosure.

Although detachable component 620 is shown to have an oval shape, other embodiments of detachable component 620 can have other shapes, such as a circular shape, a rectangular shape, a triangular shape without departing from the scope of the inventive concept of this disclosure. Furthermore, if detachable component 620 has a rectangular shape, the rectangular shape can have either right-angled corners or rounded-corners. When detachable component 620 has a rectangular shape and rounded-corners, detachable component 620 may have an appearance of a card.

In RFID switch tag 600 shown in FIG. 6, detachable component 620 may be attached to base component 610 in a number of ways. For example, detachable component 620 can be placed inside a pocket attached to base component 610. In some embodiments, detachable component 620 can be placed inside a cutout within base component 610 having a shape of detachable component 620 but configured with a slightly smaller profile to allow detachable component 620 to be securely held inside the cutout. [coupling]

According to one exemplary embodiment, RFID switch tag 600 can serve as a windshield tag. In this embodiment, base component 610 of RFID switch tag 600 can be attached to a vehicle's windshield using, for example, adhesives (e.g., adhesive strips). When RFID switch tag 600 is used as a windshield tag, RFID switch tag 600 can be used in various electronic toll collection (ETC) applications. For example, when RFID switch tag 600 is placed on a windshield with both base component 610 and detachable component 620, the at least one UHF module in detachable component 620 is coupled with UHF booster antenna 630 in base component 610 to form an UHF system having desired performances, such as a long operating range; however, when detachable component 620 is separated from base component 610 and the windshield, base component 610 can remain on the windshield but the at least one UHF module in detachable component 620 is no longer coupled to UHF booster antenna 630 in base component 610. As a result, neither the at least one UHF module in detachable component 620 nor UHF booster antenna 630 in base component 610 can be able to achieve the intended functionality of an UHF system, i.e., the UHF module is disabled.

Figure 7:
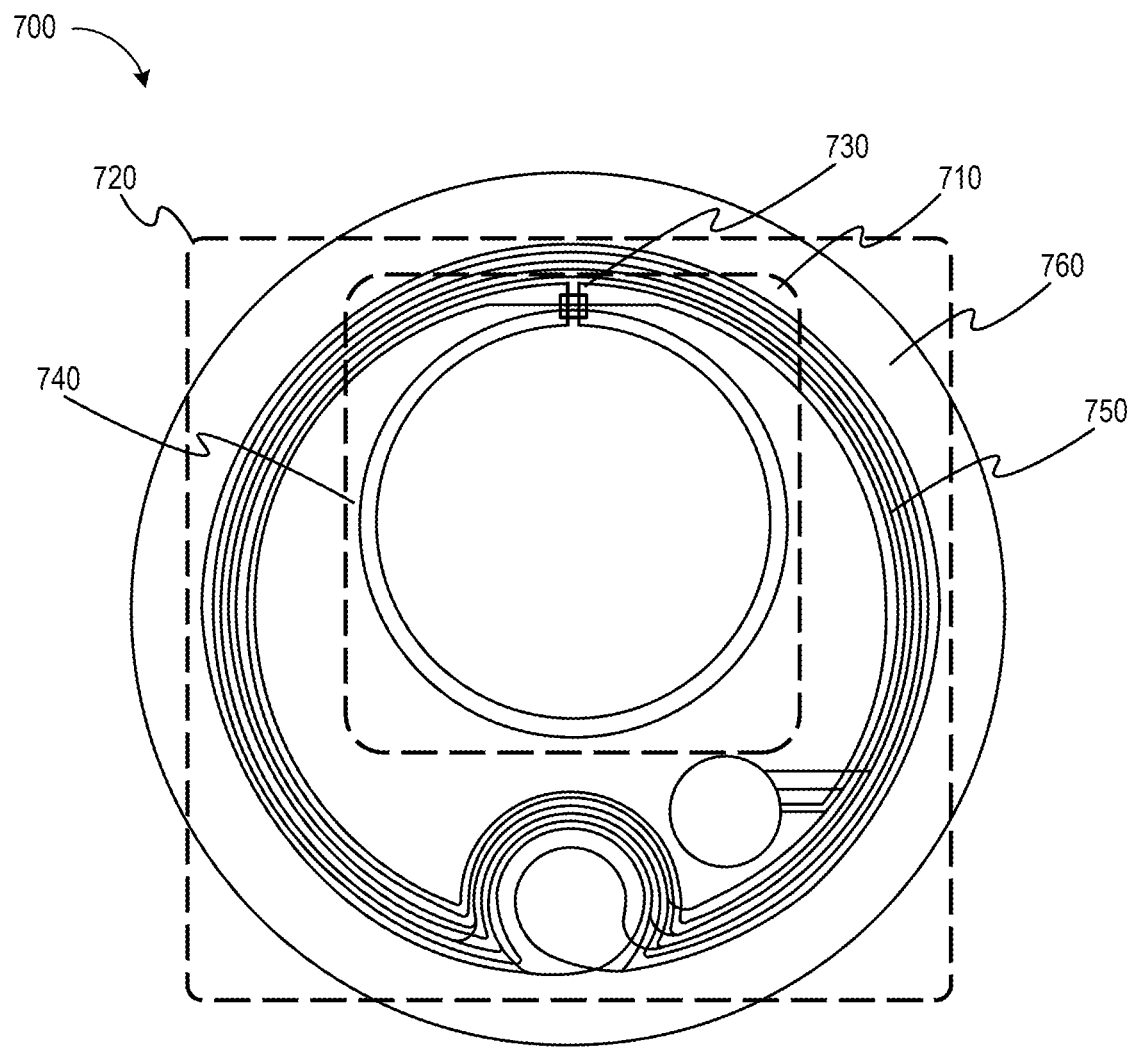
FIG. 7 shows a top-view illustration of an exemplary detachable component in the form of a dual-frequency RFID module in accordance with some embodiments described herein.

FIG. 7 shows a top-view illustration of an exemplary detachable component 620 in the form of a dual-frequency RFID module 700 in accordance with some embodiments described herein. As illustrated in FIG. 7, multi-frequency RFID module 700 includes an UHF module 710 and an NFC tag 720. More specifically, UHF module 710 further includes an integrated circuit (IC) chip 730 (or "chip 730" hereinafter) and an UHF loop 740, while NFC tag 720 further includes chip 730 and an HF antenna 750. Hence, in the embodiment shown, UHF module 710 and NFC tag 720 share chip 730. Chip 730 can include a memory (not shown) and other circuits. Dual-frequency RFID module 700 can also include a substrate 760 that provides structural supports for UHF module 710 and NFC tag 720. In various embodiments, chip 730, UHF loop 740 and HF antenna 750 can be deposited or fabricated on substrate 760.

In the embodiment of multi-frequency RFID module 700 illustrated in FIG. 7, UHF loop 740 is positioned substantially inside the loops of HF antenna 750. In some embodiments, HF antenna 750 is tuned to operate at a desired high frequency, such as 13.56 MHz. UHF loop 740 can also be tuned to operate at a desired ultra high frequency, such as 915 MHz or 2.45 GHz. In some embodiments, UHF loop 740 is used to couple chip 730 to UHF booster antenna 630 in base component 610 to form a functional UHF RFID tag. UHF loop 740 can be an UHF antenna by itself. Generally, UHF loop 740 can be implemented as any coupling means for coupling chip 730 to UHF booster antenna 630 in base component 610.

In the exemplary embodiment shown in FIG. 7, HF antenna 750 is configured as a loop antenna that includes multiple circular loops. However, in other embodiments, HF antenna 750 can be constructed with non-circular-shaped loops, such as rectangular loops without departing from the scope of the present inventive concept. Also in this embodiment, UHF loop 740 is shown to include two circular loops; however, in other embodiments, UHF loop 740 can include a single loop or more than two loops. While loops in UHF loop 740 is shown to be circular, UHF loop 740 can also be constructed with non-circular-shaped loops, such as rectangular loops without departing from the scope of the present inventive concept.

In some embodiments, chip 730 is configured to perform functions associated with both NFC and UHF systems including, but not limited to, encoding/decoding, modulation/demodulation, digital and analog processing, and data storage. Although multi-frequency RFID module 700 uses a single IC chip 730 for both the UHF RFID module and the NFC tag, other implementations of detachable component 620 can use separate IC chips for the UHF RFID module and the NFC tag.

Figure 8:
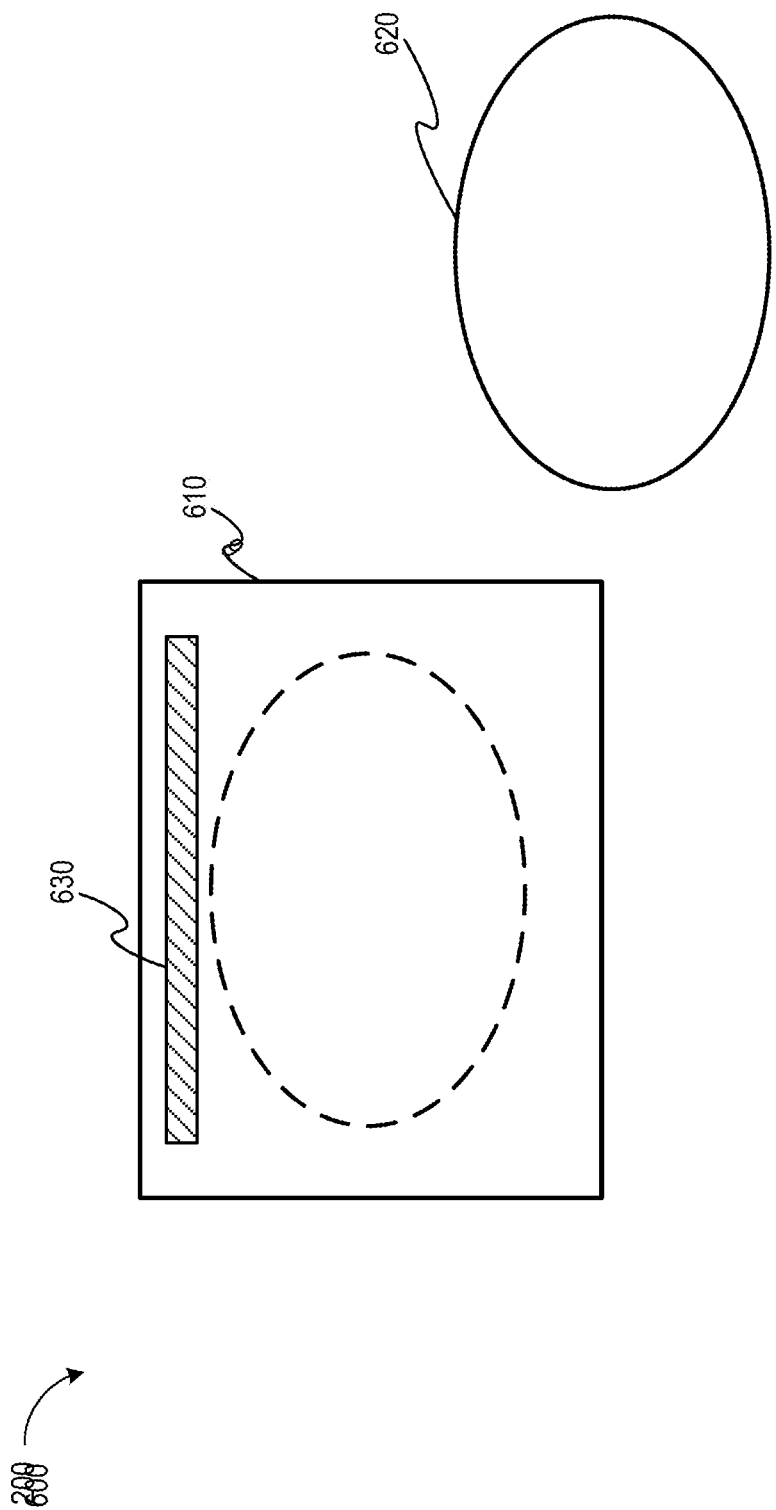
FIG. 8 shows a top-view illustration of RFID switch tag in a detached configuration in accordance with one embodiment described herein.

FIG. 8 shows a top-view illustration of RFID switch tag 600 in a detached configuration in accordance with one embodiment described herein. Referring to FIGS. 6 and 8, while FIG. 6 shows that detachable component 620 is attached to base component 610, FIG. 8 shows that detachable component 620 can be separated and detached from base component 610. Notably, detaching detachable component 620 from base component 610 uncouples the at least one UHF RFID module in detachable component 620 from UHF booster antenna 630 in base component 610. As such, when detachable component 620 is detached from base component 610, the performances of the at least one UHF RFID module may be significantly affected. For example, detaching detachable component 620 from base component 610 can render the at least one UHF RFID module nonfunctional.

Notably, the HF RFID tag such as an NFC tag within detachable component 620 can remain functional when detachable component 620 is separated from base component 610. As such, detached detachable component 620 can be used exclusively as an HF RFID tag, such as an NFC tag (e.g., for making contactless payments). When used as an NFC tag, detachable component 620 can be configured with a shape and dimensions (including width, height, and thickness) so that it is sufficiently durable and can be conveniently placed inside a wallet, a purse, or a protective cover of a portable electronic device, such as a smartphone, a tablet, or an iPad™. The dimensions of detachable component 620 can be significantly greater than a typical RFID tag. In some embodiments, a rectangular shape having a size and a thickness that resembles a credit card is preferred. When detached from base component 610, detachable component 620 can be use in a "tap and go" manner in various NFC applications without being taken out of a wallet, a purse, or a protective cover of a portable electronic device where detachable component 620 is stored and carried around. In various embodiments, detachable component 620 is configured as a laminated card so that it is sufficiently durable through extensive uses as a standalone card. In some embodiments, detachable component 620 is configured with a hard case to provide additional durability and protection.

In some embodiments, RFID switch tag 600 is used in various ETC applications. For example, the at least one UHF RFID module in RFID switch tag 600 can be configured to be used in high occupancy vehicle (HOV) lanes, while the HF RFID tag in RFID switch tag 600 can be configured to be used in single occupancy vehicle (SOV) lanes. Hence, by switching detaching detachable component 620 between the detached configuration of RFID switch tag 600 and the attached configuration of RFID switch tag 600, RFID switch tag 600 permits a driver to switch between HOV operations and SOV operations using a single RFID switch tag 600. In such embodiments, the tag 600 can include a switching mechanism that allows the user to switch between the UHF and HF tags as required. U.S. patent application Ser. No.

15/160,982, entitled "Multi-Frequency Radio Frequency Identification Tag," filed May 20, 2016, which in turn claims priority to U.S. provisional Patent Application No. 62/165,167, also entitled "Multi-Frequency Radio Frequency Identification Tag," filed May 21, 2015; U.S. patent application Ser. No. 14/818,257, entitled "Methods and Apparatus for Preserving Privacy in an RFID System," filed Aug. 4, 2015, which in turn claims priority to U.S. patent application Ser. No. 14/229,786, now U.S. Pat. No. 9,098,790, entitled "Methods and Apparatus for Preserving Privacy in an RFID System," filed Mar. 28, 2014, which in turn claims priority to U.S. patent application Ser. No. 13/736,819, now U.S. Pat. No. 8,710,960, entitled "Methods and Apparatus for Preserving Privacy in an RFID System," filed Jan. 8, 2013, which in turn claims priority to U.S. patent application Ser. No. 12/364,158, now U.S. Pat. No. 8,350,673, entitled "Methods and Apparatus for Preserving Privacy in an RFID System," filed Feb. 2, 2009, which in turn claims priority to U.S. provisional Patent Application No. 61/025,000, also entitled "Method and Apparatus for Preserving Privacy in RFID Systems," filed Jan. 31, 2008; U.S. patent application Ser. No. 14/480,458, entitled "RFID Switch Tag," filed Sep. 8, 2014, which in turn claims priority to U.S. patent application Ser. No. 13/465,829, now U.S. Pat. No. 8,844,831, entitled "RFID Switch Tag," filed May 7, 2012, which in turn claims priority to U.S. provisional Patent Application Nos. 61/487,372, filed May 18, 2011 and 61/483,586, filed May 6, 2011, both entitled "RFID Switch Tag;" U.S. patent application Ser. No. 14/578,196, entitled "RFID Switch Tag," filed Dec. 19, 2014, which in turn claims priority to U.S. patent application Ser. No. 14/060,407, now U.S. Pat. No. 8,944,337, entitled "RFID Switch Tag," filed Oct. 22, 2013, which in turn claims priority to U.S. patent application Ser. No. 13/465,834, now U.S. Pat. No. 8,561,911, entitled "RFID Switch Tag," filed May 7, 2012, which in turn claims priority to U.S. provisional Patent Application Nos. 61/487,372, filed May 18, 2011 and 61/483,586, filed May 6, 2011, both entitled "RFID Switch Tag," all of which are incorporated herein by reference as if set forth in full; for example, as described above in connection to FIGS. 1-4, disclose various embodiments of tags that allow switching between modules incorporated within a switchable and/or multi-frequency tag. Any of these mechanisms can be used in accordance with switch tag 600.

According to one exemplary embodiment, RFID switch tag 600 can be used in one or more account management applications. For example, RFID switch tag 600 can be used to track a vehicle for purposes of electronic tolling, parking access, and border control. At least some applications for the RFID switch tag 600 are described in U.S. Pat. Nos. 8,844,831 and 8,944,337, and U.S. patent application Ser. Nos. 14/480,458 and 14/578,196, the disclosures of which are incorporated herein by reference in their entirety.

In some embodiments, access to the memory on the at least one UHF module and the NFC tag included in the detachable component 620 can be granted based on a security key. The provision of secure identification solutions is described in U.S. Pat. Nos. 7,081,819, 7,671,746, 8,237,568, 8,322,044, and 8,004,410, the disclosures of which are incorporated by reference herein in their respective entirety.

Multi-frequency RFID tags such as the RFID switch tag 600 are also described in Reissued U.S. Pat. Nos. RE 43,355 and RE 44,691, the disclosures of which are incorporated by reference herein in their respective entirety.

FIGS. 1-4 above and Parent application Ser. No. 15/160,982, discloses a module that is similar to 700 that can itself me interfaced with an booster antenna and removed therefrom in order to interface with an booster antenna in another substrate, such as in a card. Here, the module 620 can be included in a card or other substrate as described, which itself can be interface with the booster antenna 630. This allows the inclusion of a switching mechanism as described above, which can allow the user to switch between, e.g., the HF and UHF modules in order to enable various functionality or applications. The switching can occur when the module 620 is interface with substrate 610, or when it is removed therefrom. Again U.S. patent application Ser. No. 15/160,982, entitled "Multi-Frequency Radio Frequency Identification Tag," filed May 20, 2016, which in turn claims priority to U.S. provisional Patent Application No. 62/165,167, also entitled "Multi-Frequency Radio Frequency Identification Tag," filed May 21, 2015; U.S. patent application Ser. No. 14/818,257, entitled "Methods and Apparatus for Preserving Privacy in an RFID System," filed Aug. 4, 2015, which in turn claims priority to U.S. patent application Ser. No. 14/229,786, now U.S. Pat. No. 9,098,790, entitled "Methods and Apparatus for Preserving Privacy in an RFID System," filed Mar. 28, 2014, which in turn claims priority to U.S. patent application Ser. No. 13/736,819, now U.S. Pat. No. 8,710,960, entitled "Methods and Apparatus for Preserving Privacy in an RFID System," filed Jan. 8, 2013, which in turn claims priority to U.S. patent application Ser. No. 12/364,158, now U.S. Pat. No. 8,350,673, entitled "Methods and Apparatus for Preserving Privacy in an RFID System," filed Feb. 2, 2009, which in turn claims priority to U.S. provisional Patent Application No. 61/025,000, also entitled "Method and Apparatus for Preserving Privacy in RFID Systems," filed Jan. 31, 2008; U.S. patent application Ser. No. 14/480,458, entitled "RFID Switch Tag," filed Sep. 8, 2014, which in turn claims priority to U.S. patent application Ser. No. 13/465,829, now U.S. Pat. No. 8,844,831, entitled "RFID Switch Tag," filed May 7, 2012, which in turn claims priority to U.S. provisional Patent Application Nos. 61/487,372, filed May 18, 2011 and 61/483,586, filed May 6, 2011, both entitled "RFID Switch Tag;" U.S. patent application Ser. No. 14/578,196, entitled "RFID Switch Tag," filed Dec. 19, 2014, which in turn claims priority to U.S. patent application Ser. No. 14/060,407, now U.S. Pat. No. 8,944,337, entitled "RFID Switch Tag," filed Oct. 22, 2013, which in turn claims priority to U.S. patent application Ser. No. 13/465,834, now U.S. Pat. No. 8,561,911, entitled "RFID Switch Tag," filed May 7, 2012, which in turn claims priority to U.S. provisional Patent Application Nos. 61/487,372, filed May 18, 2011 and 61/483,586, filed May 6, 2011, both entitled "RFID Switch Tag," disclose various switching mechanism and methods (e.g., as described above in connection to FIGS. 1-4) for switching a module such as module 620.

Some applications can require a placement of metallic material (e.g., retro-reflective material, holographic image) over the RFID switch tag 600. In order to preserve the transmission and reception capabilities of the RFID switch tag 600, a selective de-metallization process may be employed to treat the metallic material. Selective de-metallization is described in U.S. Pat. Nos. 7,034,688 and 7,463,154, the disclosures of which are incorporated by reference herein in their respective entirety.

Figure 9:
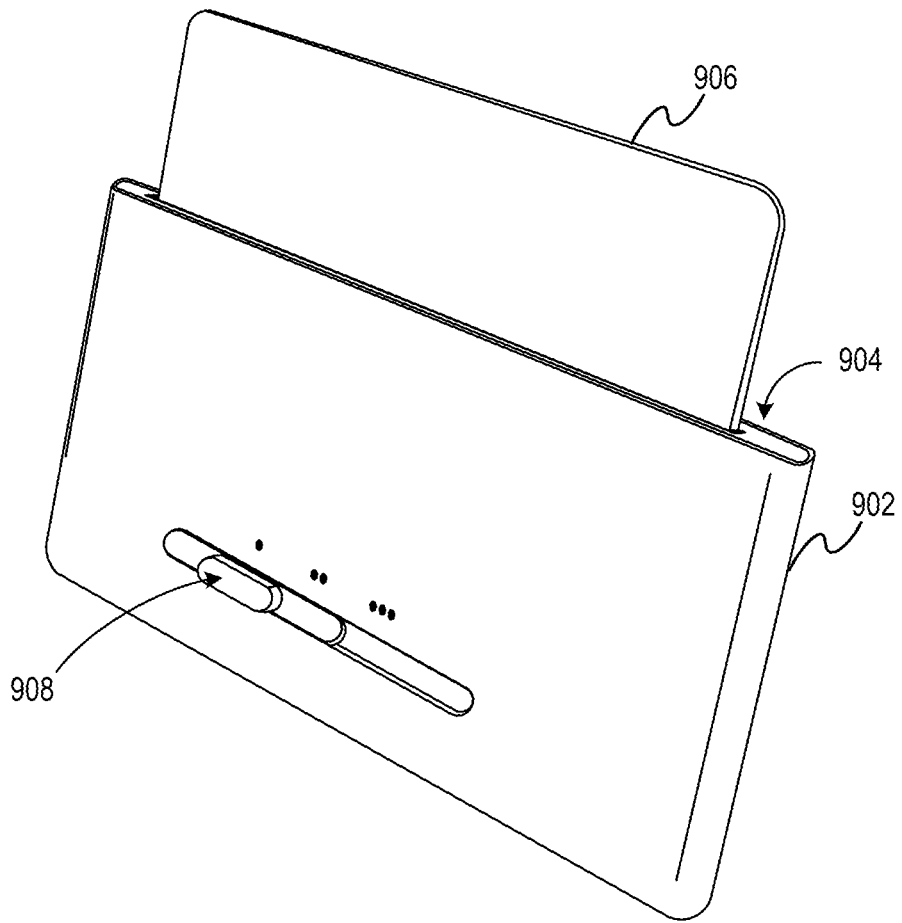
FIG. 9 shows a perspective view of a RFID system in accordance with another embodiment described herein.

In certain embodiments, the NFC, or HF tag or portion of the detachable component 620 can actually take the form of a card for use in an, e.g., NFC application. For example, the card could be a transit card used to access public transit. The card can be modified as described herein, however, to include at least one UHF module or component that can be couple to a booster antenna when the, e.g., transit card is inserted into a base unit. This is illustrated in FIG. 9, which shows a base unit 902 with slot 904 configured to receive card 906. As will be described with respect to FIG. 10, base unit 902 can also comprise a booster antenna that can couple with a UHF module included in card 906. In this manner, when card 906 is inserted in slot 904, a UHF "tag" is formed that can, e.g., function within a tolling environment.

In certain embodiments, card 906 can include multiple UHF module for, e.g., various tolling settings or applications as described above. In this case, a switch 908 can be included in order to allow the booster antenna to interface with the appropriate UHF module. When switch 908 is slid from one setting to another, the booster antenna is moved so that it will couple with the appropriate module.

Figure 10B:
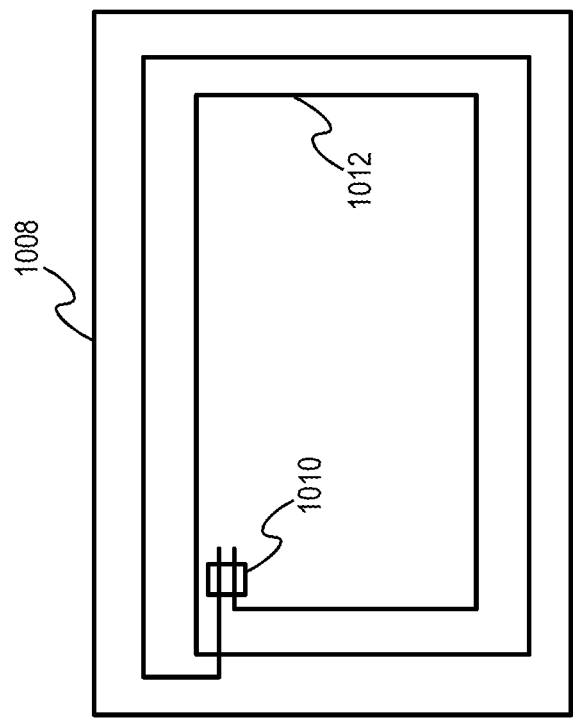
FIGS. 10A-D show the components of the embodiment shown in FIG. 9.
Figure 10A:
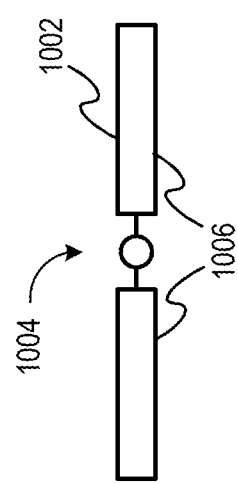

FIGS. 10A-10D illustrates the components of the system illustrated in FIG. 9. First, a UHF module 1002 is illustrated in FIG. 10A. As can be seen, module 1002 includes a chip 1004 and leads 1006. In this embodiment, leads 1006 do not act as an antenna. This is to avoid coupling with the HF antenna 1012, which is in close proximity with the UHF module 1002 included with in the same substrate 1008.

Figure 10C:
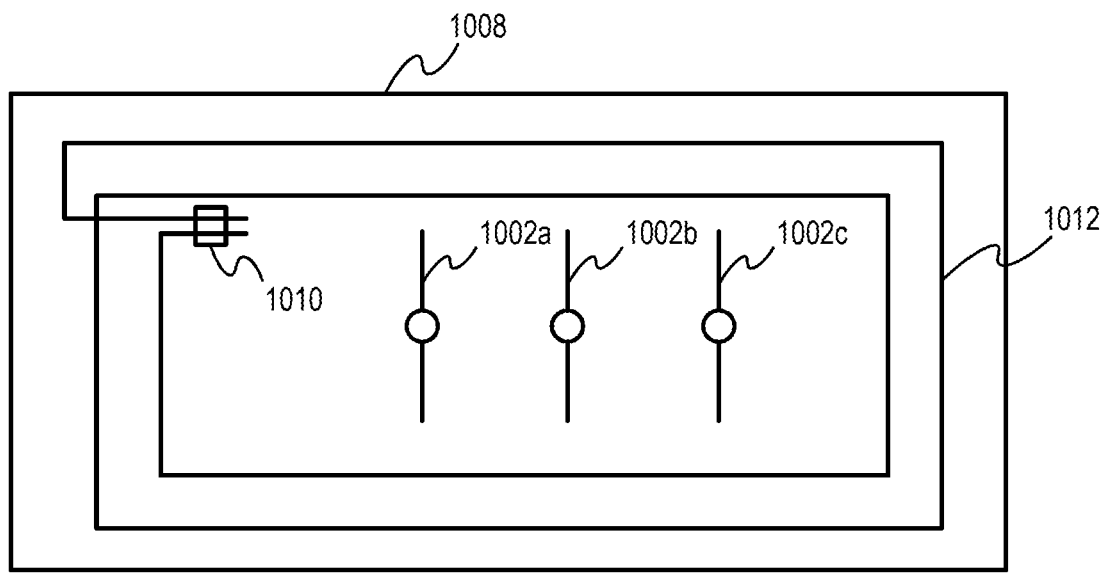

FIG. 10B illustrates the HF subsystem within card 902. As noted, card 902 will include a substrate 1008 onto, or into which an HF antenna 1012 has been formed. Antenna 1012 is then coupled with a HF chip 1010. Modules 1002 can then be place on substrate 1008 as illustrated in FIG. 10C. In the example of FIG. 10B, the modules 1002a-c are placed in the center of the substrate and substantially in the center of the loops that form antenna 1012.

Figure 10D:
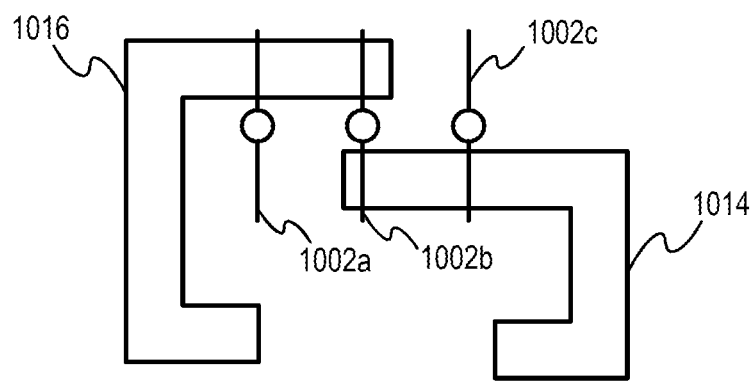

As illustrated in FIG. 10D, Antenna portions 1014 and 1016 can then be included within base unit 902. When card 906 is inserted in slot 904, antenna portions 1014 and 1016 can couple, e.g., inductively with a module 1002. If there are multiple modules, then antenna portions 1014 and 1016 can be connected with switch 908, such that when switch 908 is slid back and forth between the various positions, the antenna will couple with the appropriate module 1002a-c.

It will be understood that other forms of switching mechanisms can be included in base unit 902. The term "switching mechanism" means a device that can move the booster antenna between discrete positions so that it is interfaced with the appropriate module.

It will also be understood that different constructions for the booster antenna can be used depending on the requirements of a specific implementation. Moreover, in certain implementations, the switching mechanism can cause modules 1002 to move relative to the position of the booster antenna.

Thus, the user can insert the card 902 in order to access their tolling account and to interface with toll systems. The user can then remove the card and use it to interface with other systems such as transit systems. The user can then maintain their toll and transit accounts to ensure adequate funds are available. In other embodiments, card 902 can simply be a credit or debit card.

The example apparatuses, methods, and systems disclosed herein can be applied wireless communication devices incorporating HF and/or UHF RFID reader capabilities. The various components illustrated in the figures may be implemented as, for example, but not limited to, software and/or firmware on a processor, ASIC/FPGA/DSP, or dedicated hardware. Also, the features and attributes of the specific example embodiments disclosed above may be combined in different ways to form additional embodiments, all of which fall within the scope of the present disclosure.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described can be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

Although the present disclosure provides certain example embodiments and applications, other embodiments that are apparent to those of ordinary skill in the art, including embodiments which do not provide all of the features and advantages set forth herein, are also within the scope of this disclosure.

What is claimed is:

1. A multi-frequency radio frequency identification (RFID) tag, comprising:
   a base component including a coupling antenna;
   a detachable module removably coupled to the base component, the detachable module including,
      at least one integrated circuit (IC) chip,
      a first antenna coupled to the at least one IC chip, wherein the first antenna is tunable to operate in a first frequency range in conjunction with the IC chip, and
      a second antenna coupled to the coupling antenna when the detachable module is coupled to the base component and configured to operate in a second frequency range, the coupling antenna being communicatively coupled to the at least one IC chip via the second antenna; and
   a switching mechanism configured to switch between the first and second antennas.

2. The RFID tag of claim 1, wherein the first antenna is a coil antenna.

3. The RFID tag of claim 1, wherein the first frequency range is a high frequency (HF) range and the second frequency range is an ultra-high frequency (UHF) range.

4. The RFID tag of claim 1, wherein coupling antenna is a coil antenna tunable to operate in the second frequency range.

5. The RFID tag of claim 1, wherein the detachable module further comprises a substrate to provide structural supports for the at least one IC chip, the first antenna, and the second antenna.

6. The RFID tag of claim 1, wherein the base component comprises an aperture configured to receive the detachable module and the coupling antenna comprises an antenna structure, located in the vicinity of the aperture, such that the coupling antenna is configured to couple to at least the second antenna when the detachable module is in the aperture.

7. The RFID tag of claim 6, wherein the antenna structure is a hologram dipole antenna.

8. The RFID tag of claim 1, wherein the second antenna couples to the coupling antenna by one or more of inductive coupling and capacitive coupling.

9. The RFID tag of claim 1, wherein the first antenna and the second antenna are both electrically connected to a common IC chip.

10. The RFID tag of claim 1, wherein the functionality of the second antenna is degraded when the detachable module is physically separated from the base component.

11. The RFID tag of claim 1, wherein the at least one IC chip is configured to communicate with a first system via the first antenna when the detachable module is physically separated from the base component and the at least one IC chip is configured to communicate with a second system when the detachable module is coupled to the base component.

12. The RFID tag of claim 1, wherein the coupling antenna comprises a plurality of antenna portions and the second antenna comprises a plurality of leads, wherein the plurality of leads are configured to couple with the plurality of antenna portions when the detachable module is coupled to the base component.

13. The RFID tag of claim 1, wherein the detachable module comprises a plurality of second antennas and a plurality of IC chips each coupled to a respective second antenna, wherein the switch mechanism is configured to switch which of the plurality of IC chips is electrically coupled to the coupling antenna by changing a position of the coupling antenna relative to the plurality of second antennas.

14. The RFID tag of claim 13, wherein an IC chip of the plurality of IC chips is able to communicate via a respective second antenna when coupled to the coupling antenna and the remaining IC chips are inactive.

15. The RFID tag of claim 1, wherein the detachable module is a card insertable into an aperture of the base component.

16. A radio frequency identification (RFID) switch tag, comprising:
   a base component including antenna portions having a plurality of positions;
   a detachable module removably coupled to the base component, the detachable module including,
      a plurality of RFID modules, a first RFID module of the plurality of RFID modules configured to electrically couple to the antenna portions when the detachable module is physically coupled to the base component and the antenna portions are in a first position, the functionality of the first RFID module is degraded when the detachable module is physically coupled to the base component and the antenna portions are in another position; and
   a switching mechanism configured to change the position of the antenna portions between the first position and the other positions.

17. The RFID tag of claim 16, wherein the plurality of RFID modules comprises a second RFID module configured to electrically couple to the antenna portions when the detachable module is physically coupled to the base component and the antenna portions are in a second position, the functionality of the second RFID module is degraded when the detachable module is physically coupled to the base component and the antenna portions are in another position.

18. The RFID tag of claim 16, wherein the plurality of RFID modules comprises a third RFID module, the third RFID module is active when the detachable module is not coupled to the base component.

19. The RFID tag of claim 16, wherein the base component comprises an aperture located in the vicinity of the plurality of positions of the antenna portions, the aperture configured to receive the detachable module.

20. The RFID tag of claim 16, wherein the detachable module is a credit card.

* * * * *